US012658762B2

(12) United States Patent

Shakarzahi

(10) Patent No.: US 12,658,762 B2
(45) Date of Patent: Jun. 16, 2026

(54) CONSTANT MICRO POWER ENERGY SYSTEM (CMPES) DEVICE

(71) Applicant: Aziz Shakarzahi, Round Rock, TX (US)

(72) Inventor: Aziz Shakarzahi, Round Rock, TX (US)

( * ) Notice: Subject to any disclaimer, the term of this patent is extended or adjusted under 35 U.S.C. 154(b) by 326 days.

(21) Appl. No.: 18/438,424

(22) Filed: Feb. 10, 2024

(65) Prior Publication Data

US 2024/0364184 A1     Oct. 31, 2024

Related U.S. Application Data

(63) Continuation-in-part of application No. 18/213,270, filed on Jun. 23, 2023, now abandoned.

(60) Provisional application No. 63/355,598, filed on Jun. 25, 2022.

(51) Int. Cl.
| | |
|---|---|
| *H02K 7/18* | (2006.01) |
| *H02K 7/10* | (2006.01) |
| *H02K 23/54* | (2006.01) |

(52) U.S. Cl.
CPC ......... *H02K 7/1846* (2013.01); *H02K 7/1008* (2013.01); *H02K 23/54* (2013.01)

(58) Field of Classification Search
CPC ..... H02K 7/1846; H02K 7/1008; H02K 23/54
See application file for complete search history.

(56) References Cited

U.S. PATENT DOCUMENTS

| | | | |
|---|---|---|---|
| 2,332,294 A | 10/1943 | Bohmfalk | |
| 4,204,126 A | 5/1980 | Diggs | |
| 4,206,608 A | 6/1980 | Bell | |
| 4,229,661 A | 10/1980 | Mead | |
| 4,230,531 A | 10/1980 | Fernandopulle | |

(Continued)

FOREIGN PATENT DOCUMENTS

| | | |
|---|---|---|
| CN | 216788625 | 6/2022 |
| CN | 116771854 A | 9/2023 |

(Continued)

OTHER PUBLICATIONS

International Search Report and Written Opinion PCT/US2024-041725, dated Mar. 17, 2025, 8pp.

*Primary Examiner* — Erez Gurari

(74) *Attorney, Agent, or Firm* — Carter, DeLuca & Farrell LLP

(57) ABSTRACT

A constant micro power energy system (CMPES) device to harness sustainable energy sources and generate power including a main body structure having a base plate, a frame extending from the base plate, and a top plate positioned at the top of the frame. The CMPES device includes a flask barrel positioned in the frame and motors positioned on the top plate. The CMPES device includes a ring gear connecting the flask barrel and a motor shaft of the motor. The CMPES device includes disc generators positioned inside the flask barrel. The motors supply power to drive the flask barrel to rotate constantly at a predetermined speed in order to generate continuous and simultaneous Alternating Current (AC) and Direct Current (DC) electrical power output. The motors facilitate direct transmission to the disc generators in order to provide the electrical power output to panel systems connected to the CMPES device.

20 Claims, 32 Drawing Sheets

(56)     References Cited

U.S. PATENT DOCUMENTS

| | | | |
|---|---|---|---|
| 4,236,083 A | | 11/1980 | Kenney |
| 4,410,805 A | * | 10/1983 | Berley .................... F03G 7/016 |
| | | | 356/216 |
| 4,447,738 A | | 5/1984 | Allison |
| 4,455,834 A | | 6/1984 | Earle |
| 4,479,352 A | | 10/1984 | Yamaoka et al. |
| 4,942,736 A | | 7/1990 | Bronicki |
| 5,133,191 A | | 7/1992 | Bruhn et al. |
| 5,384,489 A | | 1/1995 | Steinmann et al. |
| 5,899,071 A | | 5/1999 | Koroneos et al. |
| 6,093,986 A | * | 7/2000 | Windhorn ............. H02K 19/36 |
| | | | 310/68 B |
| 6,957,536 B2 | | 10/2005 | Litwin et al. |
| 7,964,787 B2 | | 6/2011 | Jaisinghani |
| 8,039,984 B2 | | 10/2011 | Ridnik et al. |
| 2008/0022683 A1 | | 1/2008 | Ohler et al. |
| 2016/0197262 A1 | * | 7/2016 | Zawada ............... H10N 30/306 |
| | | | 310/300 |
| 2018/0209305 A1 | | 7/2018 | Miles |
| 2020/0271097 A1 | | 8/2020 | Burkle |

FOREIGN PATENT DOCUMENTS

| | | |
|---|---|---|
| EP | 1577549 | 9/2005 |
| JP | S63140870 | 6/1988 |
| NL | 8005063 | 4/1982 |
| WO | 8911178 A1 | 11/1989 |
| WO | 1992014054 | 8/1992 |
| WO | 2012003021 | 1/2012 |
| WO | 2013038423 | 3/2013 |
| WO | 2025170626 A1 | 8/2024 |

* cited by examiner

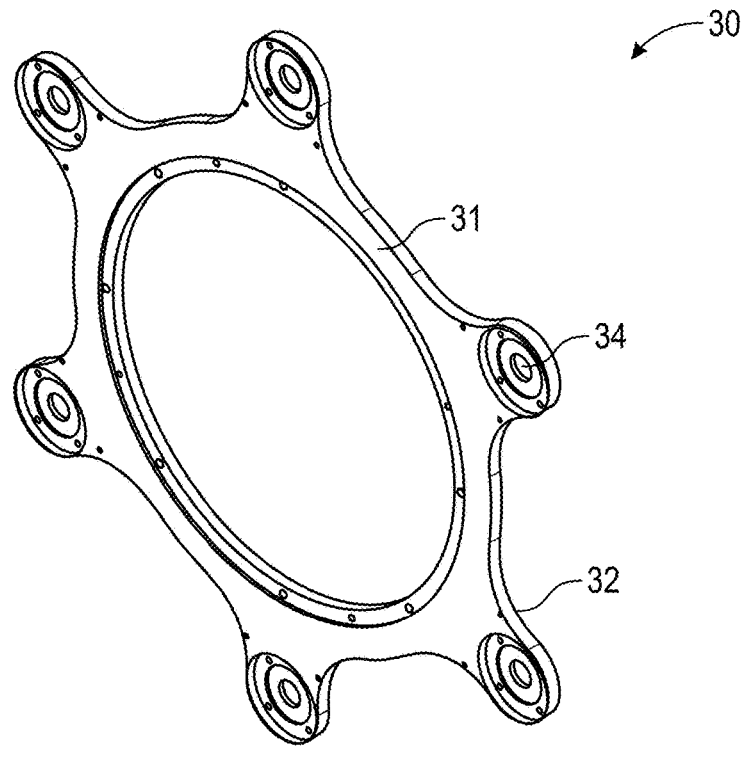
FIG. 5
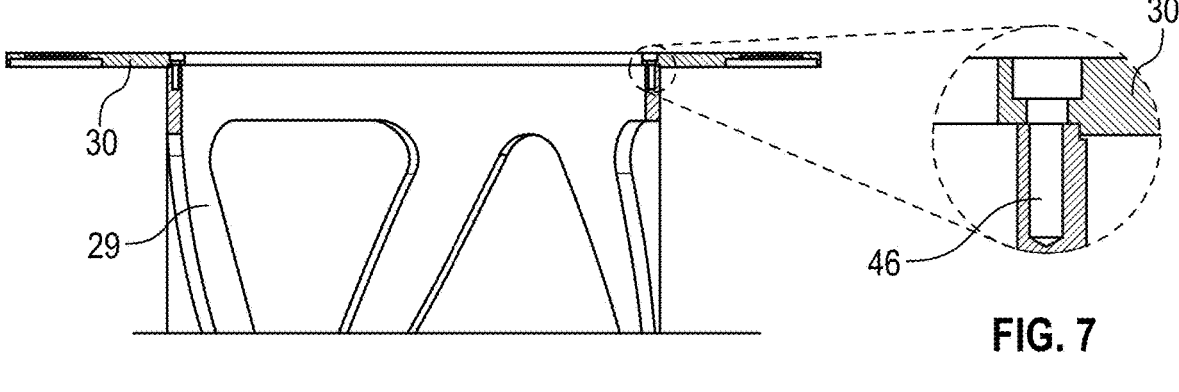
FIG. 6
FIG. 7

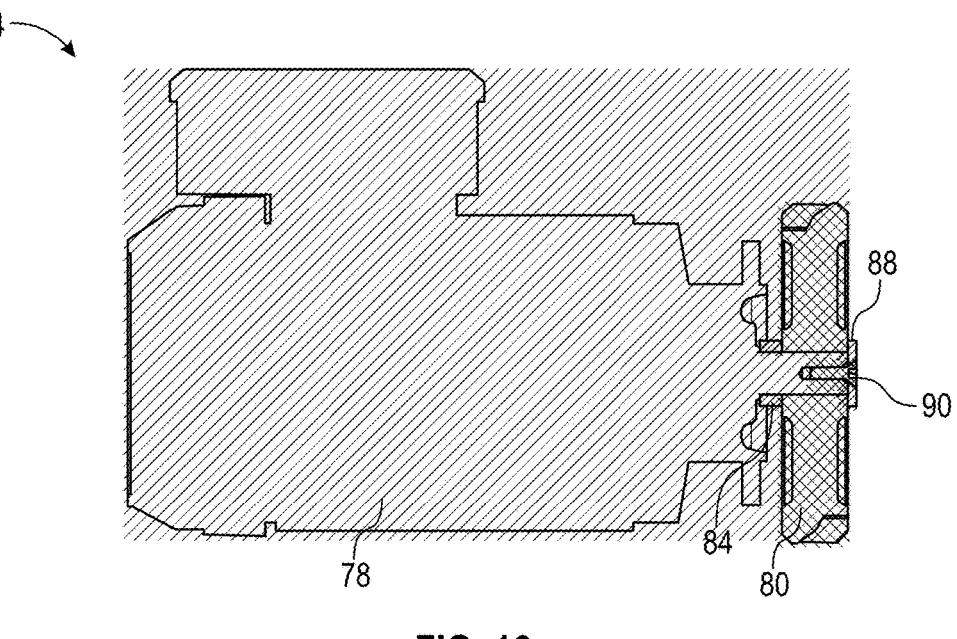
FIG. 16
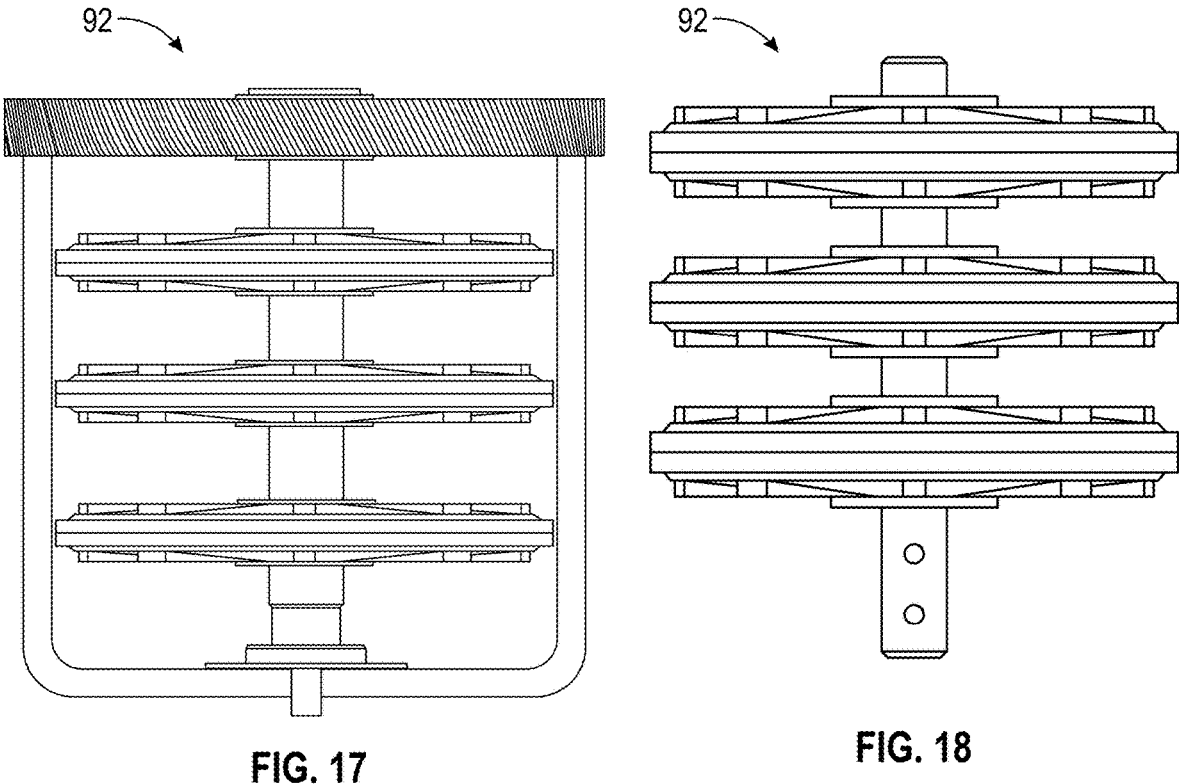
FIG. 17                              FIG. 18

200

Input data for load with 3 x (motors and pinion gear)

| | | m550 H 71 L4 | m550 H 90 M4 50 Hz | SEW ES DRN80M4 |
|---|---|---|---|---|
| Load mass | $m_{load}$ | 720 kg | 720 kg | 720 kg |
| Speed of rotation | $n_{load}$ | 250 rpm | 250 rpm | 250 rpm |
| Acceleration time | $t_a$ | 60 s | 60 s | 60 s |
| Outside diameter of cylinder | D | 750 mm | 750 mm | 750 mm |
| Inside diameter of cylinder | d | 574 mm | 574 mm | 574 mm |
| Length of cylinder | L | 900 mm | 900 mm | 900 mm |
| Friction coefficient | $\mu_{reibung}$ | 0.01 n/a | 0.01 n/a | 0.01 n/a |
| Friction diameter | $d\mu$ | 676 mm | 676 mm | 676 mm |
| Number of motors | No. | 3 n/a | 3 n/a | 3 n/a |
| Preload | | 30 % | 30 % | 30 % |

Transmission data for gearing

| | | | | |
|---|---|---|---|---|
| Modul | $m_n$ | 5 mm | 5 mm | 5 mm |
| Number of teeth driver gear | $z1$ | 27 n/a | 27 n/a | 27 n/a |
| Number of teeth driven gear | $z2$ | 150 n/a | 150 n/a | 150 n/a |
| Mass driver gear | $mz1$ | 6.29 kg | 6.29 kg | 6.29 kg |
| Mass driven gear | $mz2$ | 81.88 kg | 81.88 kg | 81.88 kg |
| Efficiency coefficient of additional transmission | Eta-z | 0.9 n/a | 0.9 n/a | 0.9 n/a |
| Max tangential force | $Ft_{max}$ | 40000 N | 40000 N | 40000 N |
| Teeth helix angle | $\beta$ | 19.528 deg | 19.528 deg | 19.528 deg |

Motor data

| | | | | |
|---|---|---|---|---|
| Nominal speed | $n_n$ | 1430 rpm | 1465 rpm | 1440 rpm |
| Nominal torque | $M_n$ | 3.67 Nm | 7.17 Nm | 4.95 Nm |
| Nominal torque at n1 | $M_{n1}$ | 3.67 Nm | 7.17 Nm | 4.95 Nm |
| Ramp up torque | $M0$ | 6.96 Nm | 16.20 Nm | 13.37 Nm |
| Max. torque | $M_{max}$ | 6.96 Nm | 16.20 Nm | 15.35 Nm |
| Motor idle torque | $M_{r-m}$ | 0 Nm | 0 Nm | 0 Nm |
| Motor rotor inertia | $J_m$ | 0.00133 Kgm^2 | 0.00538 Kgm^2 | 0.00282 Kgm^2 |
| Inertia from additional reduction( reduction/ brake, for example) | $J_d$ | 0 Kgm^2 | 0 Kgm^2 | 0 Kgm^2 |
| Motor efficiency | $\eta_{mot\%}$ | 0.771 n/a | 0.75 n/a | 0.889 n/a |
| Motor nominal power | $P_m$ | 0.55 kW | 1.10 kW | 0.75 kW |
| Motor acceleration power | Pacc | 1.04 kW | 2.49 kW | 2.31 kW |

Input data for load with 3 x (motors and pinion gear)

| | Symbol | Value 1 | Value 2 | Value 3 |
|---|---|---|---|---|
| Load mass | mload | 600 kg | 600 kg | 600 kg |
| Speed of rotation | nload | 250 rpm | 250 rpm | 250 rpm |
| Acceleration time | ta | 60 s | 60 s | 60 s |
| Outside diameter of cylinder | D | 750 mm | 750 mm | 750 mm |
| Inside diameter of cylinder | d | 574 mm | 574 mm | 574 mm |
| Length of cylinder | L | 900 mm | 900 mm | 900 mm |
| Friction coefficient | µ | 0.01 n/a | 0.01 n/a | 0.01 n/a |
| Friction diameter | du | 676 mm | 676 mm | 676 mm |
| Number of motors | No. | 3 n/a | 3 n/a | 3 n/a |
| Preload | µ xxx | 90 % | 90 % | 90 % |

Transmission data for gearing

| | Symbol | Value 1 | Value 2 | Value 3 |
|---|---|---|---|---|
| Modul | m | 5 mm | 5 mm | 5 mm |
| Number of teeth driver gear | z1 | 27 n/a | 27 n/a | 27 n/a |
| Number of teeth driven gear | z2 | 150 n/a | 150 n/a | 150 n/a |
| Mass driver gear | mz1 | 6.29 kg | 6.29 kg | 6.29 kg |
| Mass driven gear | mz2 | 81.89 kg | 81.89 kg | 81.89 kg |
| Efficiency coefficient of additional transmission | Eta-z | 0.9 n/a | 0.9 n/a | 0.9 n/a |
| Max tangential force | Ftmax | 40000 N | 40000 N | 40000 N |
| Teeth helix angle | β | 19.528 deg | 19.528 deg | 19.528 deg |

Motor data

| | Symbol | motor xxx Hz | motor xxx Hz | SEW xxx xxx |
|---|---|---|---|---|
| Nominal speed | nn | 1430 rpm | 1465 rpm | 1440 rpm |
| Nominal torque | Mn | 3.67 Nm | 7.17 Nm | 4.85 Nm |
| Nominal torque at n1 | Mn | 3.67 Nm | 7.17 Nm | 4.85 Nm |
| Ramp up torque | MD | 6.95 Nm | 16.20 Nm | 13.97 Nm |
| Max. torque | Mmax | 6.95 Nm | 16.20 Nm | 15.35 Nm |
| Motor idle torque | Mt·m | 0 Nm | 0 Nm | 0 Nm |
| Motor rotor inertia | Jm | 0.00193 Kgm^2 | 0.00538 Kgm^2 | 0.00262 Kgm^2 |
| Inertia from additional reduction( brake, for example) | Jd | 0 Kgm^2 | 0 Kgm^2 | 0 Kgm^2 |
| Motor efficiency | ηxxx | 0.771 n/a | 0.75 n/a | 0.809 n/a |
| Motor nominal power | Pm | 0.55 kW | 1.10 kW | 0.75 kW |
| Motor acceleration power | Pacc | 1.04 kW | 2.49 kW | 2.31 kW |

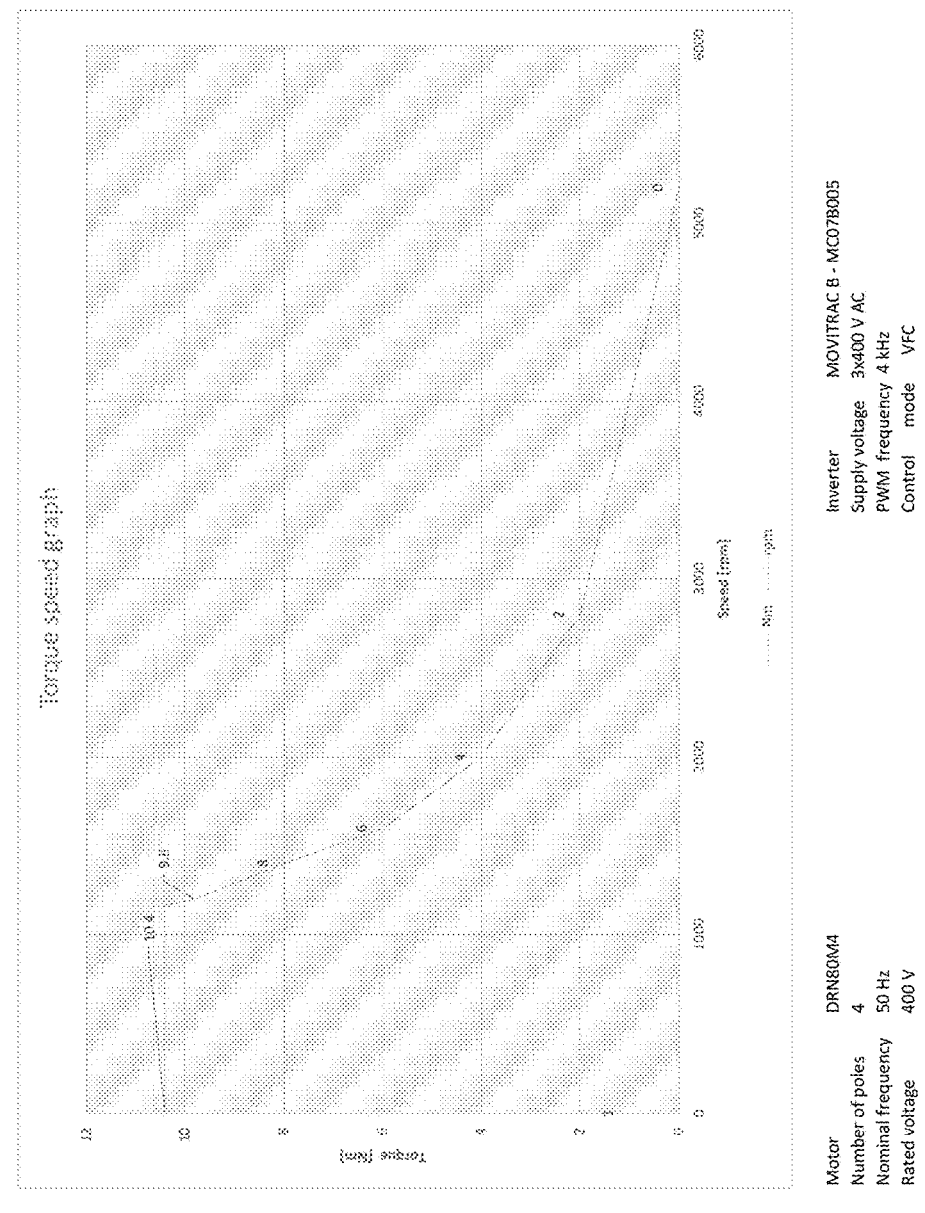
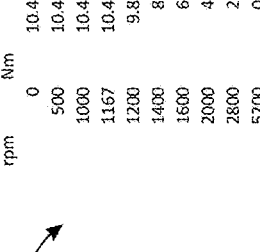
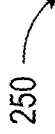
FIG. 32

260 —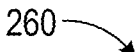

<u>Input data:</u>

Spur Gear, Gear Rack

| | |
|---|---|
| Calculation method | Spur gear |
| Calculation variants | Standard gauge spur gears |
| Calculation standard | DIN 3990 |
| Geometry calculation incl. measurement ? | no |
| Calculation of deviations ? | yes |
| Type of toothing | External toothing |

Spur gear geometry
Basic data

| | | |
|---|---|---|
| Normal modulus | $m_n = 5$ | mm |
| Helical angle | $\beta : 19,528$ | ° |
| Centre distance | $a : 0$ | mm |
| | | |
| Driving element | Pinion | |
| Input of geometry | x1, z2 | |
| Number of teeth (pinion) | $z_1 = 27$ | |
| Number of teeth (wheel) | $z_2 = 150$ | |
| Translation ratio | $i = 5,556$ | |

| | Pinion | Wheel | |
|---|---|---|---|
| Tooth width | $b = 50$ | 50 | mm |
| | | | |
| Input method for tooth-tip height modification | | No input | |
| | | | |
| Tip edge modification | | No | |

Addendum modification according to DIN 3992/3993

| | |
|---|---|
| Input methode profile shift coefficients | Sum of profile shift coefficient |
| Sum of profile shift coefficient | $x_\Sigma = 0$ |

Basic gear rack

| | Pinion | Wheel | |
|---|---|---|---|
| Tip clearance factor | $c_p^* = 0,25$ | 0,25 | |
| Root fillet radius factor | $\rho_{fp}^* : 0,25$ | 0,25 | |
| Pressure angle | $\alpha_p = 20$ | | ° |
| Tooth-tip thickness factor | $s_{ap}^* = 0,2$ | | |

Results:

General data
| | | | | |
|---|---|---|---|---|
| Effective number of teeth ratio | u | = | 5,556 | |
| Effective translation ratio | i | = | 5,556 | |
| Transverse pressure angle | $\alpha_t$ | = | 21,116 | ° |
| Pressure angle at pitch cylinder | $\alpha_{wt}$ | = | 21,116 | ° |
| Ground lead | $\beta_b$ | = | 18,307 | ° |
| Zero centre distance | $a_d$ | = | 469,507 | mm |

280

290

300 ⟍

310 ⟍

320
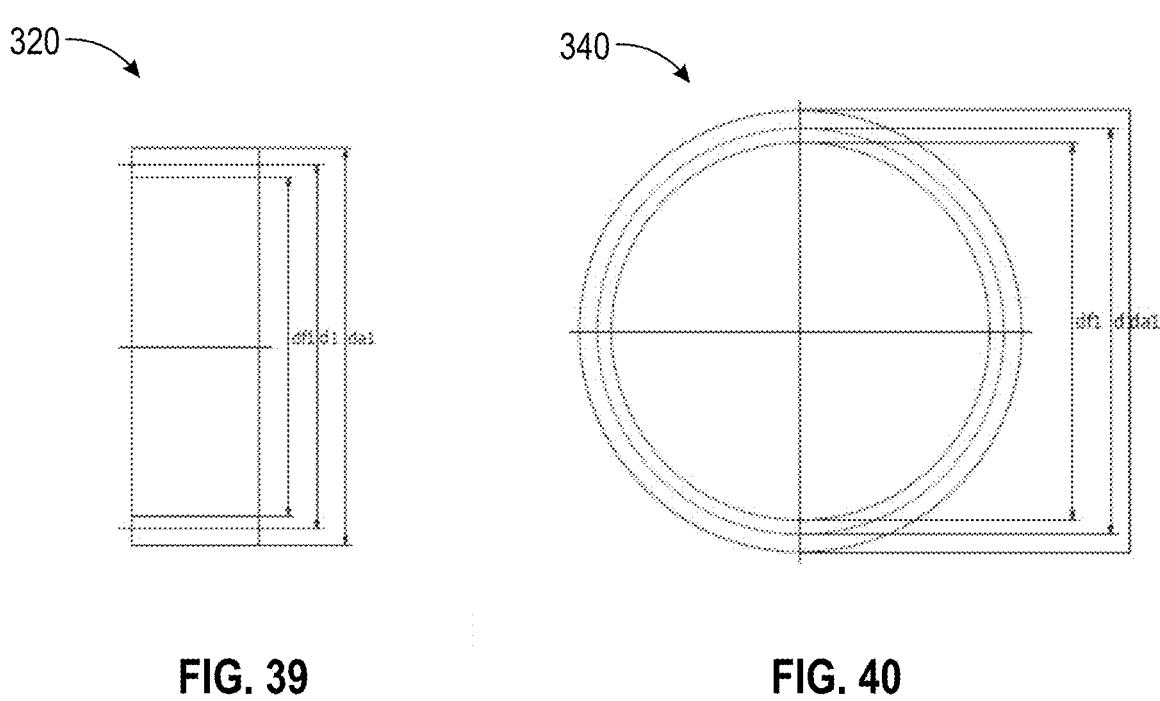
FIG. 39
340
FIG. 40
330
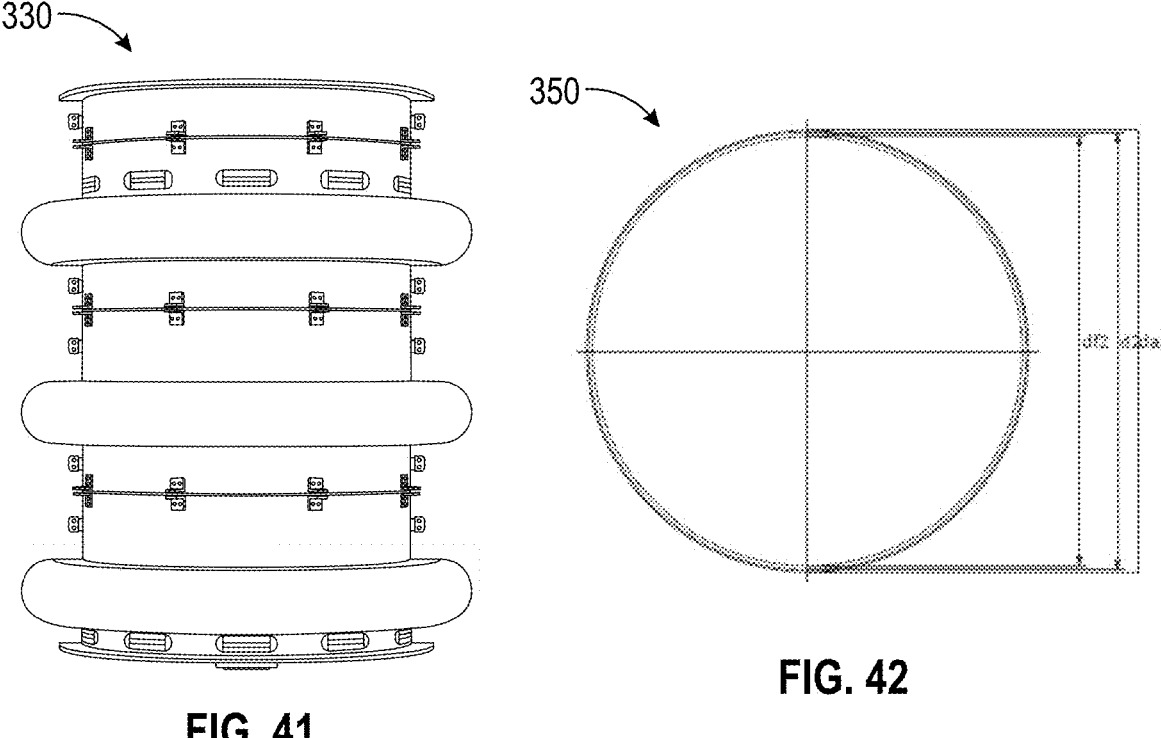
FIG. 41
350
FIG. 42

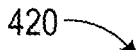
420

| Load | | | |
|---|---|---|---|
| Moment of inertia around Z axis | Ix | 3.00218 | [kgm2] |
| Mass of the mixing material | m | 150 | [kg] |
| Max rotational required speed | n | 150 | [rpm] |
| Max rotational required speed in seconds | ns | 2.5 | [rps] |
| Angular speed | ω | 15.71 | [rad/s] |
| Initial angular speed | ω0 | 0.00 | [rad/s] |
| Diameter of the rotational cylinder | d | 375 | [mm] |
| Calculation | | | |
| Required speed of rotation | v | 2.945 | [m/s] |
| Acceleration time | ta | 5 | [s] |
| Initial acceleration time | t0 | 0 | [s] |
| Angular acceleration | α | 3.1416 | [rad/s2] |
| Required maximum torque | T | 9.43163 | [Nm] |
| Human hand maximum force | F human | 200 | [N] |
| Lever handle to centre distance | L | 0.2 | [m] |
| Maximum torque by hand | Th | 40 | [Nm] |
| Maximum rotational speed by human hand | n human | 2 | [rps] |
| Maximum rotational speed by human hand | n human | 120 | [rpm] |
| Number of teeth of driver | z1 | 9 | |
| Number of teeth of driven | z2 | 7 | |
| Transmision ratio | i | 1.286 | |
| Torque at driven gear - created by hand | Tdg | 21.78 | [Nm] |
| Rotational speed at driven gear | ndg | 2.571 | [rps] |
| Rotational speed at driven gear | ndg | 154.29 | [rpm] |

FIG. 45

430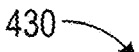

| TEDATA | | |
|---|---|---|
| Program : MDESIGN 2018 | User : Kristjan | Customer : Kristjan |
| Module version : 17.0.5 | Date : 05.12.2022 | Project : |

Bevel-, Hypoid Gear

Bevel and hypoid gear calculation

With the following program, based on the groundwork calculations according to DIN 3991, ISO 10300, AGMA 2003-C10 and DNVGL-CG-0036 the load capacity (surface durability/pitting, tooth root strength, scuffing) of bevel gears will be calculated.

Additional the geometrical calculation according to ISO 23509 or AGMA 2005-D03 can be taken. Therefor both data types (EN and AGMA) and for different input methods (General, Gleason, Oerlikon, Klingelnberg) according to the different producers can be chosen.

The bevel gears will be approached through equivalent spur gears (Tredgold Approximation). The bearing capacity calculation according relates consequently to compensated spur gears with involute gearing, whereby in general the ratio in mean tooth width of the bevel gear will be based upon.

Groundwork calculations

The groundwork calculations for this module are described by the following DIN specifications:

| - DIN 3991 | Part 1 | Edition 09. 1988 | (influence factors in general) |
|---|---|---|---|
| - DIN 3991 | Part 2 | Edition 09. 1988 | (surface durability/pitting) |
| - DIN 3991 | Part 3 | Edition 09. 1988 | (tooth root strength) |
| - DIN 3991 | Part 4 | Edition 09. 1988 | (scuffing) |
| - DIN 3990 | Part 5 | Edition Dezember 1988 | (fatigue strength values and material qualities) |
| - DIN 3971 | | Edition Juli 1980 | (concept and determinants) |
| | | Edition August 1988 | |
| - DIN 3965 | Part 1 | Edition August 1988 | (tolerances for bevel gearing groundwork) |
| - DIN 3965 | Part 2 | | (tolerances for bevel gearing tolerances for deviations of individual determinants) |
| | | Edition Dezember 1976 | |
| - DIN 50 150 | | Edition 2014 | (Rockwell-Brinell-hardness and endurance strength) |
| | | Edition 2014 | |
| - ISO 10300 | Part 1 | Edition 2014 | (influence factors in general) |
| - ISO 10300 | Part 2 | | (surface durability/pitting) |
| - ISO 10300 | Part 3 | | (tooth root strength) |
| - AGMA 2003-C10 | | Edition 2010 | (surface durability/pitting and tooth root strength) |
| - DNVGL-CG-0036 | | Edition Dezember 2015 | (surface durability/pitting, tooth root strength, scuffing, subsurface fatigue) |

Input data

Bevel- and Hypoid Gear Calculation

Preselection
   Type of gear                               Straight bevel
   Computation course               Geometry and safety
   Input method for geometrical calculation   General
   Data type                            EN
   Manufacturing methode          Generated methode Basis input data

TEDATA

| Program : MDESIGN 2018 | User : Kristijan | Customer : Kristijan |
|---|---|---|
| Module version : 17.0.5 | Date : 05.12.2022 | Project : |

Bevel-, Hypoid Gear

Base of calculation                                      ISO 23509
Hypoid offset                            a | $\xi$ = 0          mm
Shaft angle                                 $\Sigma$ = 90       °
Number of teeth (pinion)        $z_1$ | n = 7
Number of teeth (wheel)         $z_2$ | N = 9
Face width                           $b_2$ | F = 20       mm Outer pitch diameter (wheel)    $d_{e2}$ | D = 60      mm
Mean spiral angle (wheel)       $b_{m2}$ | $\gamma_R$ = 0       °

Additional input data
  Define backlash                                         jn
  Outer normal backlash          $j_{en}$ : 0.05        mm
  Nominal design pressure angle on coast side    $a_{DC}$ = 25    °
  Nominal design pressure angle on drive side    $a_{DD}$ = 25    °
  Choice for addendum and dedendum angle          Calculation
  Depthwise taper                                  Standard Profile shift coefficient        $x_{hm1}$ = 0
  Basic crown gear addendum factor  $k_{hap}$ = 1
  Basic crown gear dedendum factor  $k_{hfp}$ = 1.25
  Thickness modification coefficient (theoretical) $x_{smn}$ = 0.01

Input data for bearing test
  Calculation base                                DIN 3991
  Operating                                     Push operating
  Performance                      P : 0.1462      kW
  Torque                       $T_1$ | $T_P$ : 9.43163   N·m
  Velocity                     $n_1$ | $n_P$ = 159      1/min
  Application factor           $K_A$ | $K_A$ = 1.1

|  | Pinion | Wheel |  |
|---|---|---|---|
| Quality class of gearing | 6 | 6 |  |
| Averaged roughness (tooth flank) | $R_{fl}$ = 20 | 20 | μm |
| Averaged roughness (tooth root) | $R_{r}$ = 20 | 20 | μm |

Driving element                                   Pinion
Flank modification                                Crowning
Force range FZG-test                                 11
Mounting factor                    $K_{Hb-be}$ : 1
Face load factor contact stress    $K_{Hb}$ | $K_{Hb}$ : 0
Face load factor bending stress    $K_{Fb}$ | $K_{Fb}$ : 0
Transverse load factor contact stress  $K_{Ha}$ : 0
Transverse load factor bending stress  $K_{Fa}$ : 0

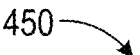

| TEDATA | | |
|---|---|---|
| Program : MDESIGN 2018 | User : Kreltjan | Customer : Kristjan |
| Module version : 17.0.5 | Date : 05.12.2022 | Project : |

Bevel-, Hypoid Gear $\times \, S_{gr} = 65$    %

Input data
   Pinion-Material (strength values) according to     MDESIGN database
   Material designation     16MnCr4
   Material number     1.5714
   Material group     Casehardening steel
   Austenite content for casehardening steel     20-30%
   Standard dimension     $d_{Np} = 16$   mm
   Yield point for $d_{Np}$     $R_p N = 695$   MPa
   Nominal stress number (bending)     $\sigma_{Flim} = 425$   MPa
   Allowable stress number of contact stress     $\sigma_{Hlim} = 1500$   MPa
   Modulus of elasticity     $E = 210000$   MPa
   Poisson's ratio     $n = 0.3$
   Density     $r = 7850$   kg/m³

Wheel-Material (strength values) according to     MDESIGN database
   Material designation     16MnCr4
   Material number     1.5714
   Material group     Casehardening steel
   Austenite content for casehardening steel     20-30%
   Standard dimension     $d_{Np} = 16$   mm
   Yield point for $d_{Np}$     $R_p N = 695$   MPa
   Nominal stress number (bending)     $\sigma_{Flim} = 425$   MPa
   Allowable stress number of contact stress     $\sigma_{Hlim} = 1500$   MPa
   Modulus of elasticity     $E = 210000$   MPa
   Poisson's ratio     $n = 0.3$
   Density     $r = 7850$   kg/m³

Lubrication demand
   Bulk oil temperature     $\theta_{oil} = 24$   °C
   Density oil (15°C)     $r_{oil} = 877$   kg/m³
   Lubrication     Splash lubrication Additional cutter data
   Residual fillet undercut     no
   Protuberance on cutter     $p_r = 0.22$   mm
   Grinding allowance     $q = 0.14$   mm Pinion       Wheel
   Cutter edge radius     $r_{a0} = 0.38$     0.38

Minimal safety
   Safety factor for contact stress     $S_{Hmin} = 1.1$

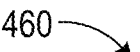

| TEDATA | | |
|---|---|---|
| Program : MDESIGN 2018 | User : Kristjan | Customer : Kristjan |
| Module version : 17.0.5 | Date : 05.12.2022 | Project : |

Bevel-, Hypoid Gear

Safty factor for bending stress $S_{Fmin} = 1.2$
Safety factor for scuffing $S_{Smin} = 1.3$

_____

Results:

Basic gearing input data

| | | | |
|---|---|---|---|
| Number of teeth (pinion) | $z_1$ | = | 7 |
| Number of teeth (wheel) | $z_2$ | = | 9 |
| Gear ratio | u | = | 1.29 |
| Hypoid offset | a | = | 0    mm |
| Cutter radius | $r_{c0}$ | = | 0    mm |

Pitch cone parameters

| | | | | |
|---|---|---|---|---|
| Shaft angle | $\delta$ | = | 90 | ° |
| Face width factor | $b_{w2}$ | = | 0.5 | |

| | | | Pinion | Wheel | |
|---|---|---|---|---|---|
| Pitch angle | $\delta$ | = | 37.87 | 52.13 | ° |
| Mean spiral angle | $b_m$ | = | 0 | 0 | ° |
| Mean cone distance | $R_m$ | = | 28.01 | 28.01 | mm |

Supplementary data

| | | | | |
|---|---|---|---|---|
| Nominal design pressure angle (on drive side) | $a_{nD}$ | = | 25 | ° |
| Nominal design pressure angle (on coast side) | $a_{nC}$ | = | 25 | ° |
| Influence factor of limit pressure angle | $f_{tan}$ | = | 0 | |
| Profile shift coefficient | $x_{hm1}$ | = | 0 | |
| Basic crown gear addendum factor | $k_{hap}$ | = | 1 | |
| Basic crown gear dedendum factor | $k_{hfp}$ | = | 1.25 | |
| Thickness modification coefficient (theoretical) | $x_{smn}$ | = | 0.01 | |

Basic data

| | | | | |
|---|---|---|---|---|
| Mean normal module | $m_{mn}$ | = | 4.91 | mm |
| Outer transverse module | $m_{et}$ | = | 6.67 | mm |
| Mean normal pressure angle | $a_n$ | = | 25 | ° |
| Clearance | c | = | 1.23 | mm |

Geometry

Cone distances

| | | | Pinion | Wheel | |
|---|---|---|---|---|---|
| Inner pitch cone distance | $R_i$ | = | 18.01 | 18.01 | mm |
| Outer pitch cone distance | $R_e$ | = | 38.01 | 38.01 | mm |

Diameters

| | Pinion | Wheel |
|---|---|---|

Figure 50:
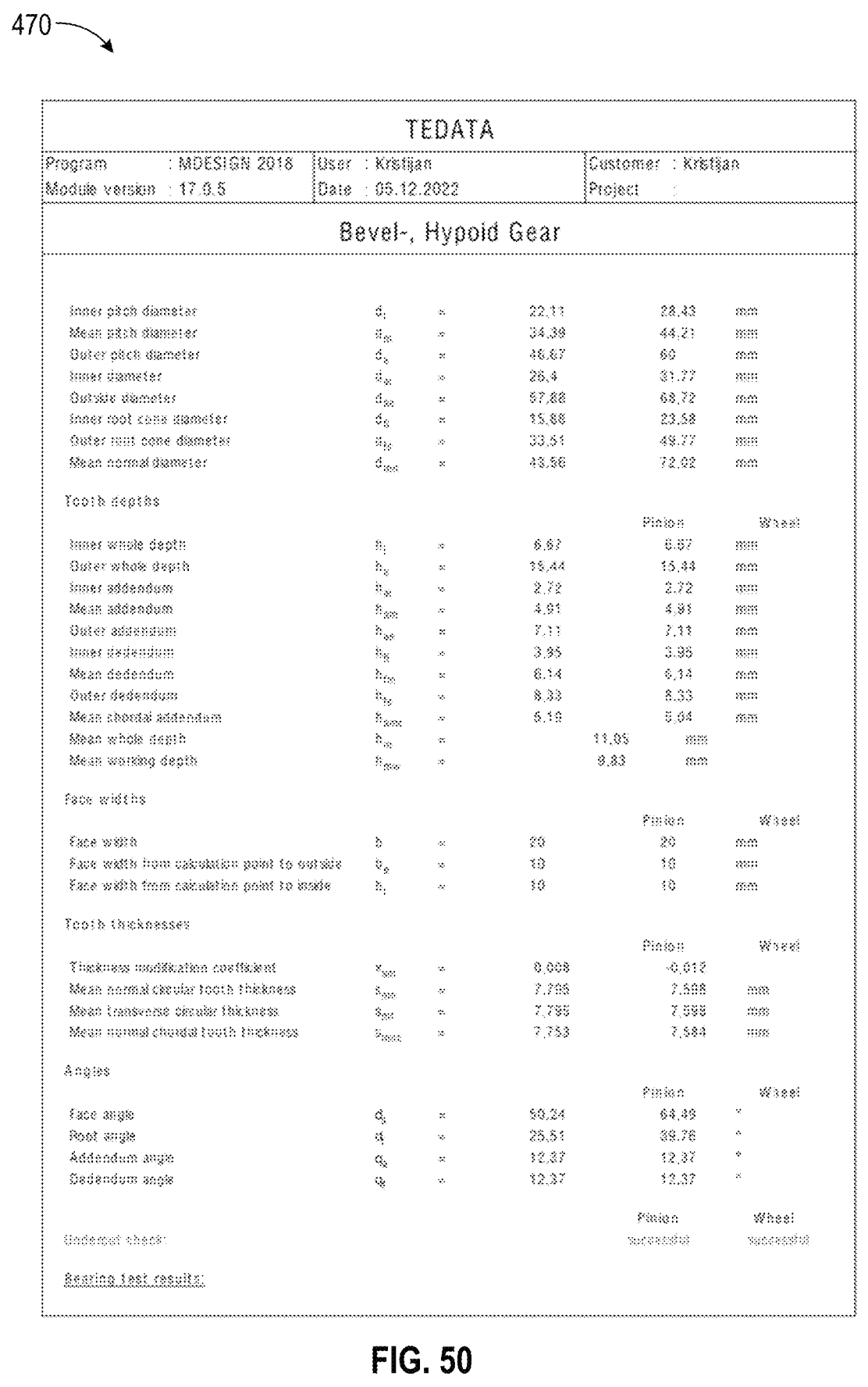

480 ——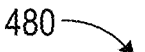

| TEDATA | | |
|---|---|---|
| Program      : MDESIGN 2018 | User : Kratjan | Customer : Kratjan |
| Module version : 17.0.5 | Date : 05.12.2022 | Project    : |

Bevel-, Hypoid Gear

Force and torque
Torque rating $T_1$ = 9.43 N*m
Circumference at the pitch circle $F_{mt}$ = 548.54 N
Axial force $F_{ax}$ = 157.64   201.91 N
Radial force $F_{rad}$ = 201.91   157.64 N
Number of load cycles $N_L$ = 0   0

Influencing factors
Dynamic factor $K_V$ = 1
Face load factor for contact stress $K_{H\beta}$ = 1.5
Face load factor for bending stress $K_{F\beta}$ = 1.5
Transverse load factor for contact stress $K_{H\alpha}$ = 1.11
Transverse load factor for bending stress $K_{F\alpha}$ = 1.11

Surface durability (pitting)
Bevel gear factor (flank) $Z_K$ = 0.85
Zone factor $Z_H$ = 2.29
Elasticity factor $Z_E$ = 191.65
Overlapping factor (flank pressure) $Z_\epsilon$ = 0.95
Helical factor (flank pressure) $Z_\beta$ = 1
Lubricant factor $Z_L$ = 0.91
Roughness factor $Z_R$ = 0.85
Speed factor $Z_V$ = 0.94
Individual meshing factor (pinion) $Z_B$ = 1.31
Individual meshing factor (wheel) $Z_D$ = 0.93

|  |  |  | Pinion | Wheel |  |
|---|---|---|---|---|---|
| Size factor | $Z_X$ | = | 1 | 1 | |
| Contact stress | $\sigma_H$ | = | 776.83 | 573.98 | N/mm² |
| Boundary contact stress | $\sigma_{HG}$ | = | 1089.88 | 1089.88 | N/mm² |
| Permissible contact stress | $\sigma_{HP}$ | = | 996.61 | 996.61 | N/mm² |
| Safety factor for contact stress | $S_H$ | = | 1.41 | 1.9 | |

Tooth root strength
Overlapping factor (root stress) $Y_\epsilon$ = 0.83
Helical factor (root stress) $Y_\beta$ = 1

|  |  |  | Pinion | Wheel |  |
|---|---|---|---|---|---|
| Tooth form factor | $Y_{Fa}$ | = | 3.07 | 3.12 | |
| Stress correction factor | $Y_{Sa}$ | = | 1.48 | 1.5 | |
| Size factor | $Y_X$ | = | 1 | 1 | |
| Relative surface factor | $Y_{R rel}$ | = | 0.99 | 0.99 | |
| Relative support coefficient | $Y_{\delta rel T}$ | = | 0.93 | 0.94 | |
| Tooth root stress | $\sigma_F$ | = | 44.35 | 45.87 | N/mm² |
| Boundary tooth root stress | $\sigma_{FG}$ | = | 786.68 | 789.64 | N/mm² |
| Permissible tooth root stress | $\sigma_{FP}$ | = | 655.57 | 658.03 | N/mm² |
| Safety factor for bending stress | $S_F$ | = | 17.66 | 16.92 | |

Scuffing load capacity

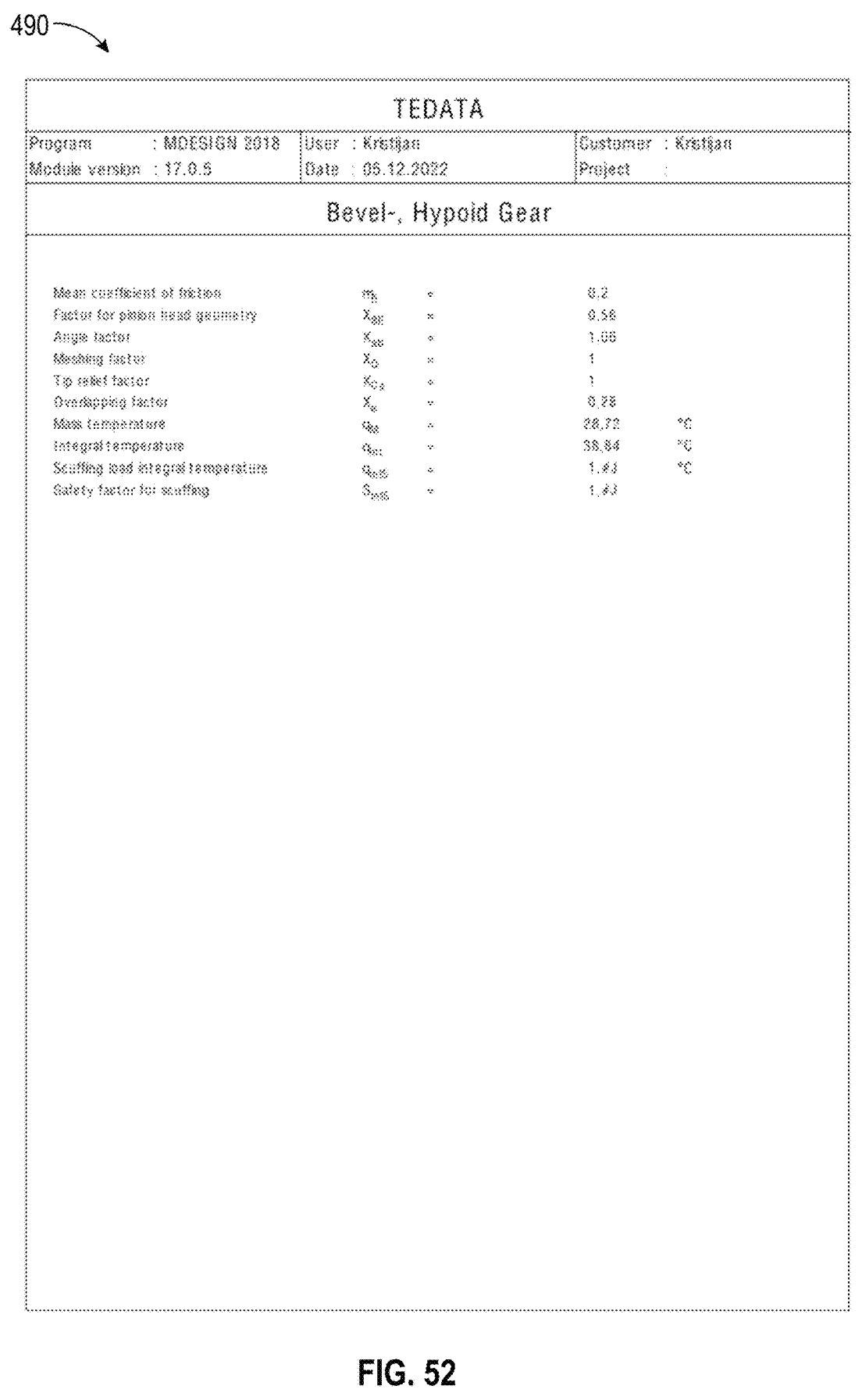

| TEDATA | | | |
|---|---|---|---|
| Program    : MDESIGN 2018 | User : Kristjan | | Customer : Kristjan |
| Module version : 17.0.5 | Date : 06.12.2022 | | Project    : |

Bevel-, Hypoid Gear

| | | | | |
|---|---|---|---|---|
| Mean coefficient of friction | $m_h$ | ° | 0.2 | |
| Factor for pinion head geometry | $X_{BE}$ | × | 0.58 | |
| Angle factor | $K_{BE}$ | ° | 1.06 | |
| Meshing factor | $X_Q$ | × | 1 | |
| Tip relief factor | $K_{Q_2}$ | ° | 1 | |
| Overlapping factor | $X_{\epsilon}$ | - | 0.28 | |
| Mass temperature | $\theta_{M}$ | ° | 38.73 | °C |
| Integral temperature | $\theta_{int}$ | ° | 38.84 | °C |
| Scuffing load integral temperature | $\theta_{inS}$ | ° | 1.43 | °C |
| Safety factor for scuffing | $S_{inS}$ | - | 1.43 | |

FIG. 52

CONSTANT MICRO POWER ENERGY SYSTEM (CMPES) DEVICE

RELATED APPLICATIONS AND CLAIM FOR PRIORITY

The present application claims priority to U.S. Non-Provisional patent application Ser. No. 18/213,270, filed Jun. 23, 2023; which claims the benefit of U.S. Provisional Application No. 63/355,598, filed Jun. 25, 2022; all of which is incorporated herein in its entirety and referenced thereto.

TECHNICAL FIELD

The present disclosure relates to cylindrical disc flux generators, and in particular, relates to a constant micro power energy system (CMPES) device designed to harness sustainable energy sources and generate power while maintaining zero carbon emissions.

DESCRIPTION OF THE RELATED ART

The depletion of non-renewable energy sources, including coal and oil, has led to a global energy crisis. The global energy crisis has prompted a growing need for alternative and renewable energy sources to meet the increasing demand for power. Among the renewable energy sources, wind power has emerged as a promising solution. Wind turbines have become a prevalent technology for harnessing wind energy and converting it into electricity. However, despite their widespread use, existing wind turbines face various limitations that hinder their optimal performance and efficiency. Addressing these limitations is crucial to fully unlock the potential of wind power and ensure a sustainable energy future. Traditional wind turbines face a significant drawback in their performance, particularly in low wind conditions. The wind turbines have a minimum wind speed requirement to initiate electricity generation, rendering them ineffective when wind speeds are insufficient. As a result, consistent and reliable electricity generation from the wind turbines becomes challenging, especially in regions with lower wind speeds.

In addition, devices that utilize renewable energy, hereinafter referred as renewable energy devices, often grapple with sustainability and storage limitations. For instance, solar and wind power heavily rely on favorable weather conditions, and the captured energy needs to be stored for future use. Unfortunately, unfavorable weather conditions can disrupt power generation, and the cost of storage batteries can be prohibitively high. These constraints pose obstacles to the widespread adoption of renewable energy sources, hampering progress toward a more sustainable future.

Some of the renewable energy systems have been disclosed in the past. An example is disclosed in a U.S. Pat. No. 5,384,489, entitled "Wind-powered electricity generating system including wind energy storage" ("the '489 Patent"). The '489 Patent discloses a wind-powered electricity generating system including a wind energy storage and recovery device. The wind energy storage and recovery device include a wind-powered electricity generator (not necessarily a system of the invention), a heater operable with electricity from the generator, thermal fluid heated by the heater, a tank to store the heated fluid, and a stored heat energy extractor. In addition to the storage and recovery device, the system of the invention also includes blades mounted to rotate a shaft of a wind-powered generator in response to the wind to create electricity, and switch means actuable in response to the amount of electricity created by the generator for applying electricity to the heater. In another aspect the invention relates to a method for storing wind energy.

Another example is disclosed in a European Publication No. 1,577,549, entitled "Apparatus for storing thermal energy and generating electricity" ("the '549 Publication"). The '549 Publication discloses a system for storing thermal energy, comprising a heat storage device with a heat storage medium operating between a lower and a higher temperature level, a first heat generating means comprising an electrical resistor inside the heat storage device for heating the heat storage medium with electrical power, a first heat transfer means for transferring thermal energy from the heat storage device to a thermodynamic machine for generating electricity, Traditional wind turbines and other renewable energy devices with storage systems suffer from a notable limitation, i.e., limited power output. Traditional wind turbines usually employ a configuration of two or multiple blades connected to a central shaft and generator. The design constraint restricts the potential energy generation capacity of the turbine and poses challenges in maximizing the efficient capture of wind energy. As a result, there is a need for innovative solutions that can overcome these limitations and enable higher power output while optimizing the utilization of wind energy resources.

Moreover, traditional wind turbines and most renewable energy systems are often burdened with high manufacturing, installation, and maintenance costs. Traditional wind turbines and renewable energy systems demand specialized equipment and skilled labor, rendering them costly and inaccessible for numerous communities, particularly in developing countries. The expense associated with acquiring and maintaining renewable energy solutions hampers their widespread adoption and impedes progress towards achieving sustainable and affordable energy access for all.

Consequently, there is a need for innovative approaches that address these cost-related challenges and facilitate the deployment of renewable energy technologies on a broader scale. To overcome these limitations, there exists a demand for a groundbreaking electric energy generator that can effectively produce electricity across various conditions, exhibit a high power output, and offer cost-effective manufacturing, installation, and maintenance processes.

SUMMARY

It is an object of the present invention to provide a constant micro power energy system (CMPES) device designed to harness sustainable energy sources and generate power while maintaining zero carbon emissions and that avoids the drawback of known wind turbines and other renewable energy devices.

It is another object of the present invention to provide an efficient and reliable solution for electricity generation that surpasses the constraints of existing technologies and also facilitates the widespread adoption of sustainable power sources.

In order to achieve one or more objects, the present invention provides a constant micro power energy system (CMPES) device to harness sustainable energy sources and generate power. The CMPES device includes a main body structure having a base plate, a frame extending from the base plate, and a top plate positioned at the top of the frame. The CMPES device includes a flask barrel positioned in the frame and motors positioned on the top plate. The CMPES device includes a ring gear connecting the flask barrel and a motor shaft of each motor. The ring gear has 150 helically shaped teeth, with an outer diameter of 803.2 mm, and an inner diameter of 596 mm. The ring gear provides speed reduction and torque increase. The CMPES device includes disc generators positioned inside the flask barrel. In one example, five disc generators are inserted inside the flask barrel. The disc generators are constructed from high-quality aluminum parts. The motors supply power to drive the flask barrel to rotate constantly at a predetermined speed in order to generate continuous electrical power output. The motors facilitate direct transmission to the disc generators in order to provide the electrical power output to panel systems connected to the CMPES device.

In one aspect, the motors include six-geared motors positioned on the top plate. Each motor is directly splined to a helical gear having 27 teeth with an outer diameter of 149.7 mm. Each motor is configured to deliver a power output of 0.075 kW to 1.1 kW. In one implementation, two or more motors (preferably three motors out of six motors) are configured to be in an active state and remaining motors are configured to be in a resting state. The motors in the active state are configured to deliver a combined power output of 2.25 kW to rotate the flask barrel constantly. In the present invention, three of the six motors are switched selectively and operated to generate a combined power output of 2.25 kW to rotate the flask barrel constantly. Each of three motors has a minimum power output of 0.75 kW per motor and three motors are used to achieve the flask barrel speed of 250 rotations per minute. Here, each motor presents a Nominal torque of one motor is 4.95 (Newton meter) Nm while its max (peak) torque is 12.7 Nm. In one example, a motor with a power output of 1.1 kW is utilized at 83% capacity during the initial acceleration stage and 32% capacity during nominal operation.

In another aspect of the present invention, the CMPES device includes a perforated sheet metal protective fence securely placed on twelve distance rings, ensuring a safe distance from the motor drive gear and the machine ring gear. Further, the CMPES device includes two half-circle sheet metal decorative panels encapsulating the bottom side of the main body structure. Furthermore, the CMPES device includes a cover cap made from PA6 plastic, designed for easy insertion onto the main barrel flask, featuring a flange for convenient opening and closing.

In yet another aspect of the present invention, the CMPES device can be used with a hand crank system for turning the disc flux generator to initiate power for the cylinder motors.

In yet another aspect of the present invention, a single CMPES device can be used for simultaneous AC and DC variant output by One CMPES system device. Here, the AC and DC outputs are provided distinct from one another simultaneously. Such a CMPES device can be used in transportation, aviation and marine vehicles and vessel to ensure seamless and distinct AC and DC outputs.

In addition. The CMPES device allows to adjust discs to be switched OFF and switched ON without changing the functionality of rotating cylinder. This helps to achieve refinements to ensure a smoother rotation of desired discs. Further, the CMPES device presents an open section with the base. The open section allows the user to insert the flask barrel and disc flux generators thereby providing convenient access for maintenance procedures and disc insertion. Additionally, the unique CMPES device design allows for ambient air flow within the system. The CMPES device design can be optimized for improving air flow efficiency.

In one advantageous feature of the present invention, the CMPES device presents a compact and efficient solution for harnessing electric energy and generating electricity. By incorporating disc flux generators, the gears, the motors, and optimized barrel shapes, the CMPES device ensures consistent power output in desired kilowatts. The CMPES device presents high power output, portability, low maintenance requirements, environmental friendliness, scalability, and cost-effectiveness. With a capacity to generate up to 100 kW or more, the CMPES device can be implemented in various settings, from residential to commercial and industrial.

In another advantageous feature of the present invention, the compact and lightweight design of the CMPES device enables easy transportation and installation, making it particularly suitable for remote areas or temporary setups where power is in high demand. Its minimal moving parts reduce maintenance needs, ensuring exceptional durability and longevity. By harnessing electric energy, the CMPES device contributes to the reduction of greenhouse gas emissions and dependence on fossil fuels, providing a clean and sustainable source of electricity. The CMPES device operates with minimal noise. As such, the CMPES device is suitable for residential areas, and its modular design allows effortless scalability to meet specific power requirements. Its efficient operation, combined with low maintenance needs and the ability to generate power in various conditions establishes the CMPES device as a cost-effective solution for renewable energy generation.

The features and advantages of the invention here will become more apparent in light of the following detailed description of selected embodiments, as illustrated in the accompanying FIGURES. As will be realized, the invention disclosed is capable of modifications in various respects, all without departing from the scope of the invention. Accordingly, the drawings and the description are to be regarded as illustrative in nature.

BRIEF DESCRIPTION OF THE DRAWINGS

The present invention will now be described in detail with reference to the drawings, which are provided as illustrative examples of the invention so as to enable those skilled in the art to practice the invention. Notably, the FIGURES and examples are not meant to limit the scope of the present invention to a single embodiment, but other embodiments are possible by way of interchange of some or all of the described or illustrated elements and, further, wherein:

FIG. 5 illustrates a bottom perspective view of top plate, in accordance with one embodiment of the present invention;

FIG. 6 illustrates dowel pins used to press-fit the top plate to a frame, in accordance with one embodiment of the present invention;

FIG. 7 illustrates an enlarged view of the dowel pins press-fitted into position between the top plate and a main welded structure, in accordance with one embodiment of the present invention;

FIG. 15 and FIG. 16 illustrate a perspective view and a cross-sectional view, respectively of a motor, in accordance with one embodiment of the present invention;

FIG. 17 and FIG. 18 illustrate perspective views of a disc flux generator, in accordance with one embodiment of the present invention;

FIG. 27 and FIG. 28 illustrate tables presenting initiation calculation and selection of motor, in accordance with one embodiment of the present invention;

Figure 30:
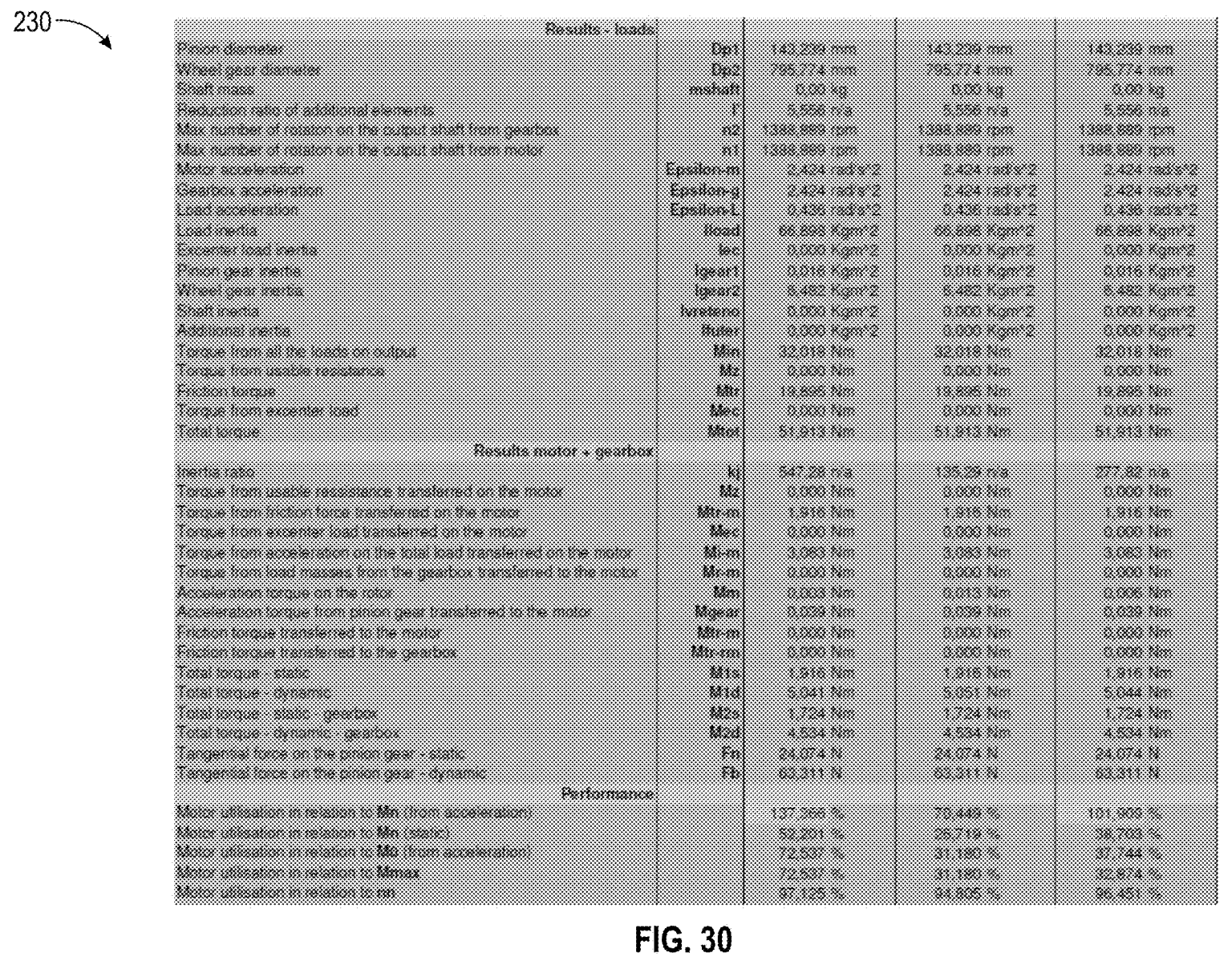

FIG. 29 and FIG. 30 illustrate tables showing the results obtained based on the initiation calculation, in accordance with one embodiment of the present invention;

FIG. 31 and FIG. 32 illustrate motor characteristics, in accordance with one embodiment of the present invention;

FIG. 33 illustrates a table showing input data for gear profile, in accordance with one embodiment of the present invention;

FIG. 35, FIG. 36, FIG. 37, FIG. 38, FIG. 39, FIG. 40, FIG. 41 and FIG. 42 illustrate gear profiles, in accordance with one embodiment of the present invention;

FIG. 45 illustrates a table showing gears and cylinder sizes, in accordance with one embodiment of the present invention; and FIG. 46, FIG. 47, FIG. 48, FIG. 49, FIG. 50, FIG. 51 and FIG. 52 illustrate Pinion and wheel bevel gear (bevel and hypoid gear for 5 kW cylinder barrel) calculations, in accordance with one embodiment of the present invention.

DETAILED DESCRIPTION

The following detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed CMPES device. However, it will be apparent to those skilled in the art that the presently disclosed invention may be practiced without these specific details. In some instances, well-known structures and devices are shown in functional or conceptual diagram form in order to avoid obscuring the concepts of the presently disclosed CMPES device.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention provides a description of a CMPES device, it is to be further understood that numerous changes may arise in the details of the embodiments of the CMPES device. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

Figure 1A:
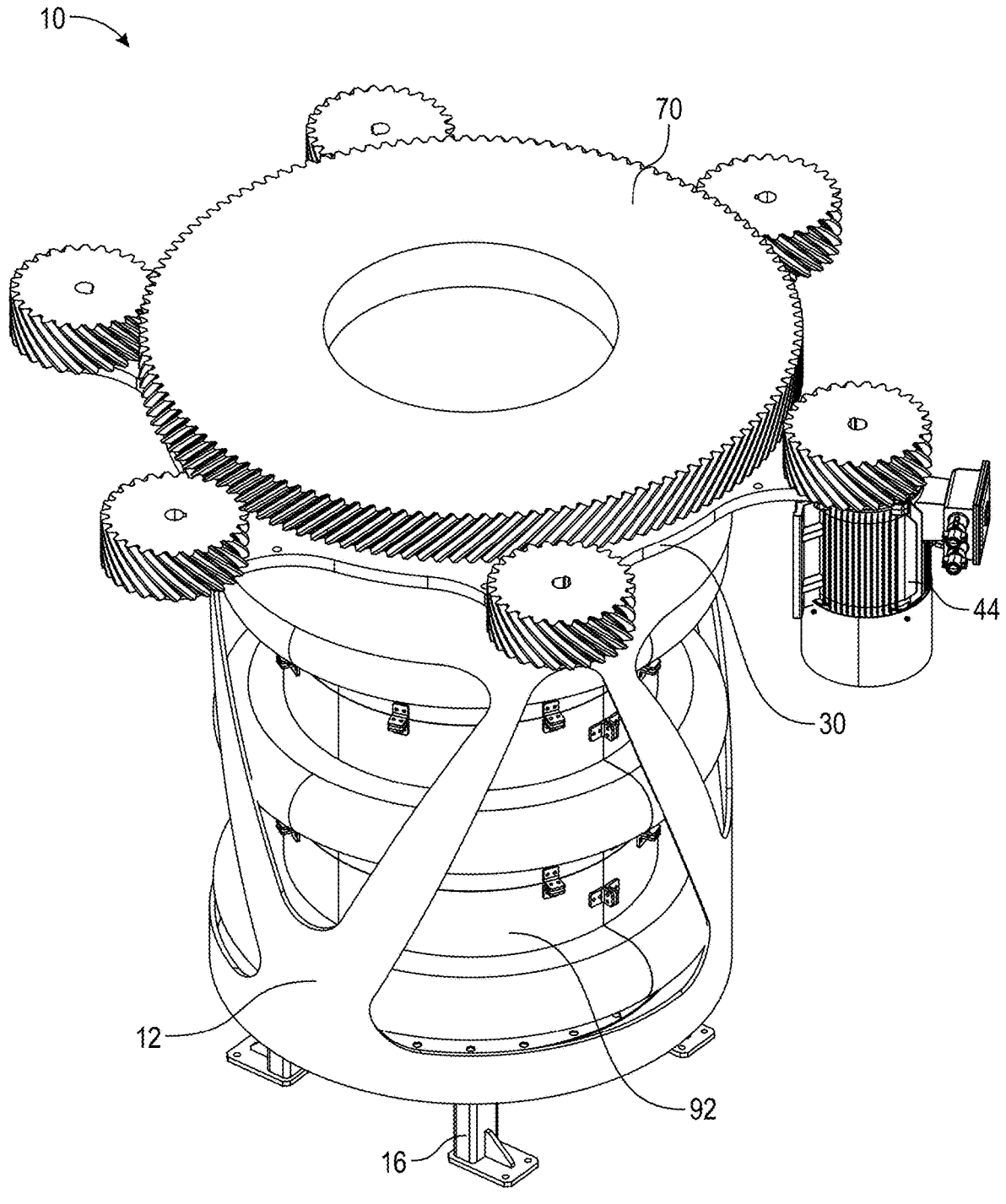
FIG. 1A and FIG. 1B illustrate a perspective view and a side view, respectively of view of a constant micro power energy system (CMPES) device, in accordance with one embodiment of the present invention.

Various features and embodiments of a constant micro power energy system (CMPES) device are explained in conjunction with the description of FIGS. 1A-52.

Figure 1B:
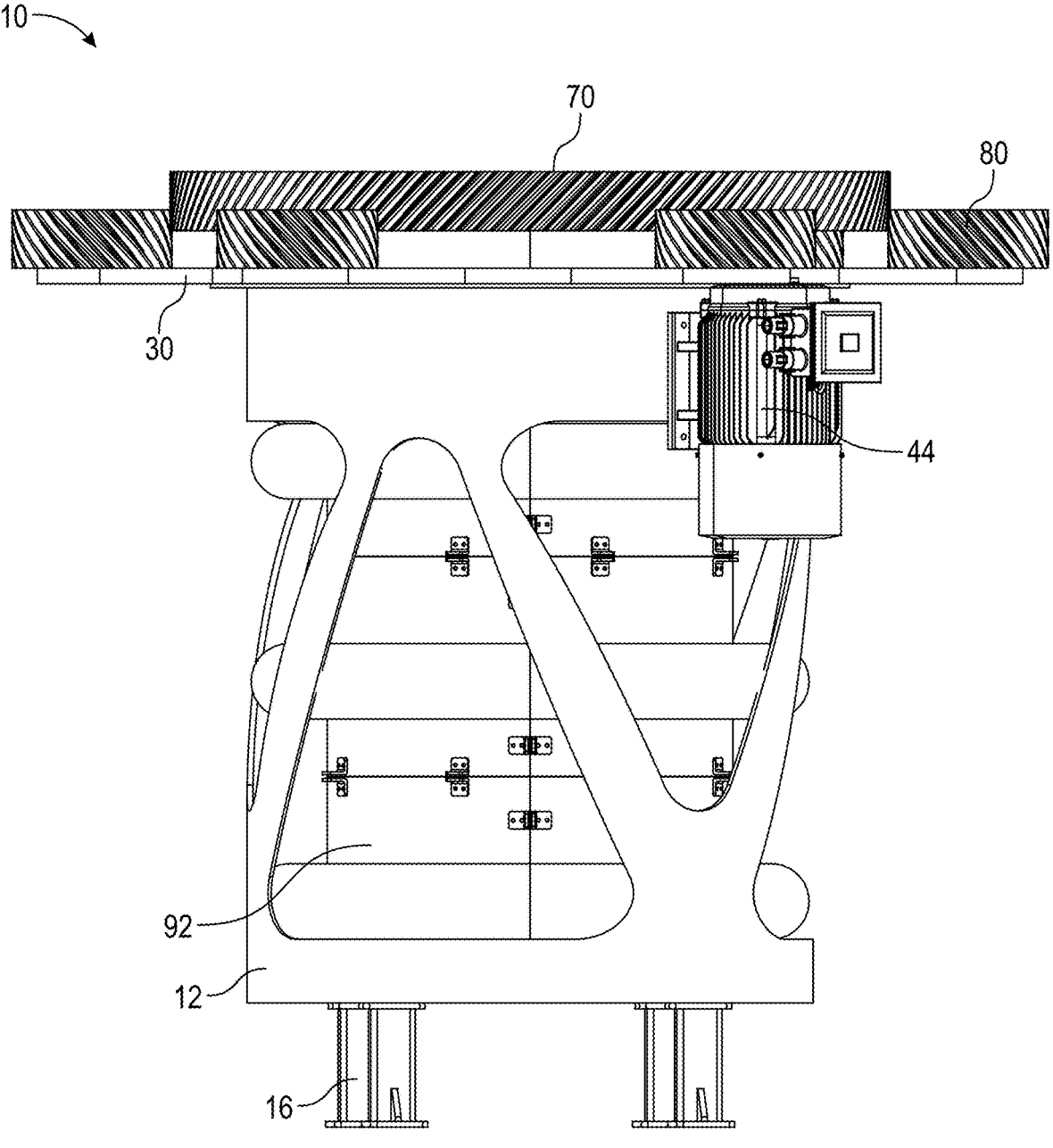
Figure 2:
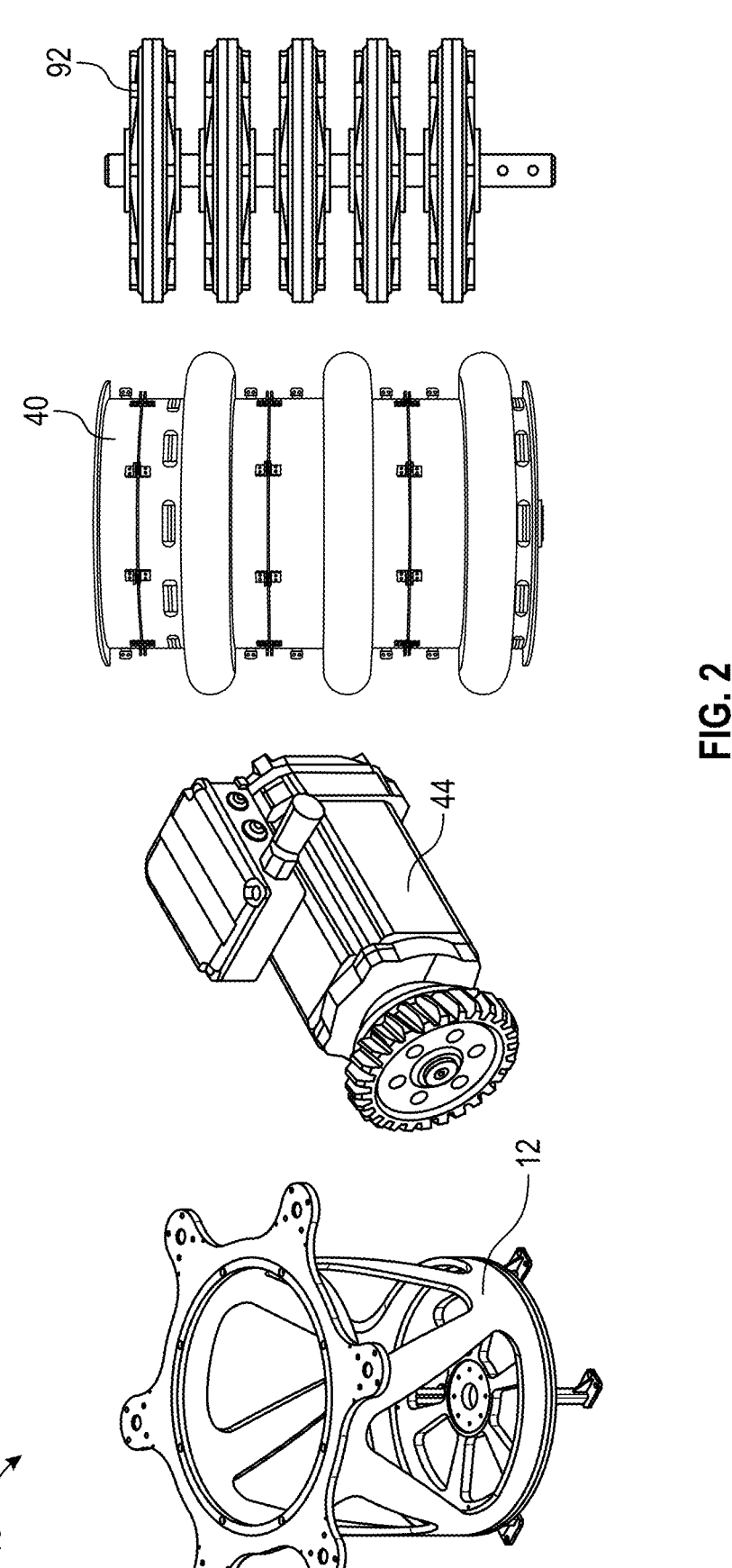
FIG. 2 illustrates the CMPES device, in accordance with one embodiment of the present invention.
Figure 3:
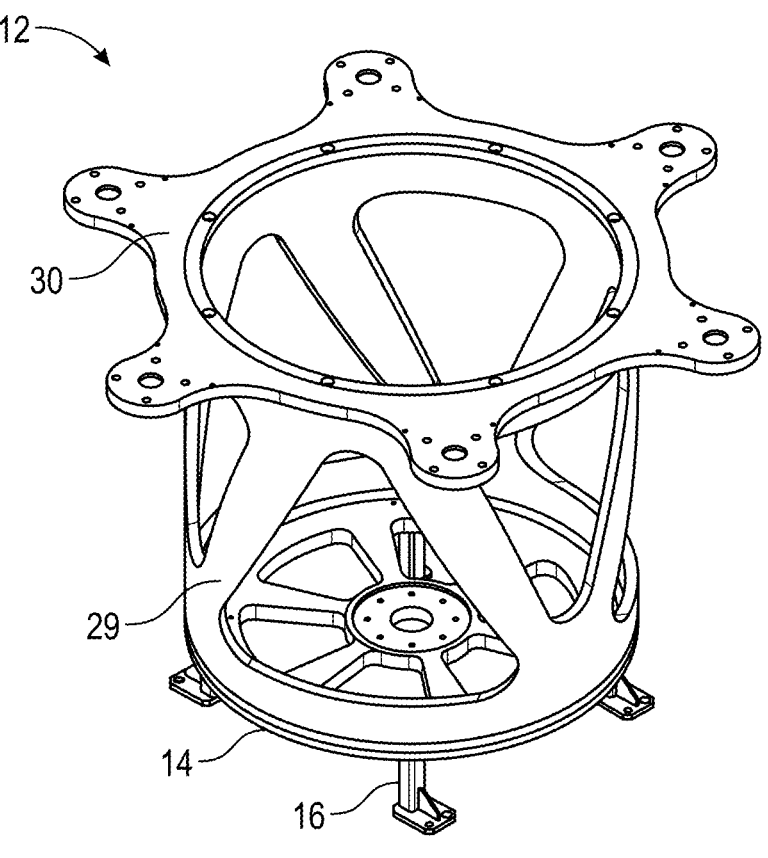
FIG. 3 illustrates a perspective view of main body structure, in accordance with one embodiment of the present invention.

FIG. 1A and FIG. 1B show a perspective view and a side view, respectively of view of a constant micro power energy system (CMPES) device 10, in accordance with one embodiment of the present invention. Further, FIG. 2 shows components of CMPES device 10 placed side by side, in accordance with one embodiment of the present invention. CMPES device 10 includes a main body structure 12. FIG. 3 shows a perspective view of main body structure 12. Main body structure 12 includes a base plate 14 having legs 16. Base plate 14 comes in a circular configuration. In one example, main body structure 12 includes four legs 16. Legs 16 connect to base plate 14 using known mechanisms such as welding, fastener, etc. The welded connection ensures a strong and reliable connection between legs 16 and base plate 14 enabling CMPES device 10 to withstand external forces and vibrations.

Figure 4:
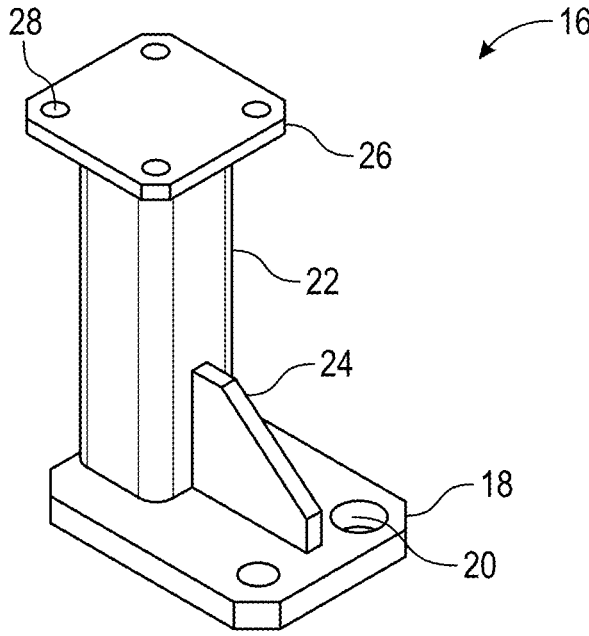
FIG. 4 illustrates a perspective view of leg, in accordance with one embodiment of the present invention.

FIG. 4 shows a perspective view of leg 16, in accordance with one embodiment of the present invention. Leg 16 includes a leg base 18. Leg base 18 comes in a relatively flat configuration. Leg base 18 includes two leg holes 20. One leg hole 20 helps to anchor CMPES device 10 to the floor using an anchor screw (not shown) in order to ensure stability during operation. Another leg hole 20 helps to level CMPES device 10 in order to achieve optimal balance and alignment. Leg 16 includes a leg column 22 extending from leg base 18. In one example, leg 16 has a support member 24 that is welded to leg base 18 and leg column 22. Support member 24 provides additional support to retain leg base 18 and leg column 22 in position. Further, leg 16 includes a leg connecting plate 26. Leg connecting plate 26 positions above leg column 22 and connects to base plate 14. Leg connecting plate 26 has holes 28 for drawing fasteners (not shown) in order to connect to base plate 14. Legs 16 are designed to securely anchor CMPES device 10 to the floor and adjusted for proper leveling. Legs 16 enhance the overall stability and performance of CMPES device 10 ensuring its efficient operation in various environments.

Main body 12 has a frame 29 extending upwards from base 14. Main body 12 includes a top plate 30, as shown in FIG. 3. In one example, top plate 30 is fabricated from durable steel material and undergoes pre-machining processes prior to assembly. Top plate 30 has a circular rim 31 having six arms 32. FIG. 5 shows a bottom perspective view of top plate 30. As can be seen, arms 32 extend from circular rim 31. Each arm 32 includes motor receiving sections 34. Top plate 30 mounts at the top of a flask barrel 40 (FIG. 2). Top plate 30 mounts at the top of flask barrel 40 in a centered position and helps to connect ring gear 42 and six geared motors 44.

In order to connect top plate 30 to flask barrel 40, top plate 30 is fastened using socket screws (not shown). The socket screws ensure a robust and reliable attachment between top plate 30 and flask barrel 40 providing structural integrity to the overall assembly of CMPES device 10. In addition to the screw fastening, after the assembly process and tightening of the socket screws, four centering dowel pins 46 are press-fitted into position between top plate 30 and the main welded structure. FIG. 6 shows dowel pins 46 used to press-fit top plate 30 to frame 29. Further, FIG. 7 shows an enlarged view of dowel pins 46 press-fitted into position between top plate 30 and the main welded structure. Here, dowel pins 46 enhance the stability of top plate 30 and prevent any potential twisting or rotation of the screws particularly when subjected to excessive torque from motors 44. This additional measure reinforces the structural integrity and reliability of CMPES device 10 during operation.

In one implementation, a suitable surface protection treatment is applied on CMPES device 10 to protect the entire structure against corrosion and to ensure its long-term durability. The corrosion-resistant coating safeguards CMPES device 10 from environmental factors and extends its operational lifespan. The constructional features of top plate 30, fasteners, and dowel pins 46, CMPES device 10 achieve a robust and secure assembly. The surface protection against corrosion further enhances its longevity, ensuring reliable performance over an extended period.

Figure 8:
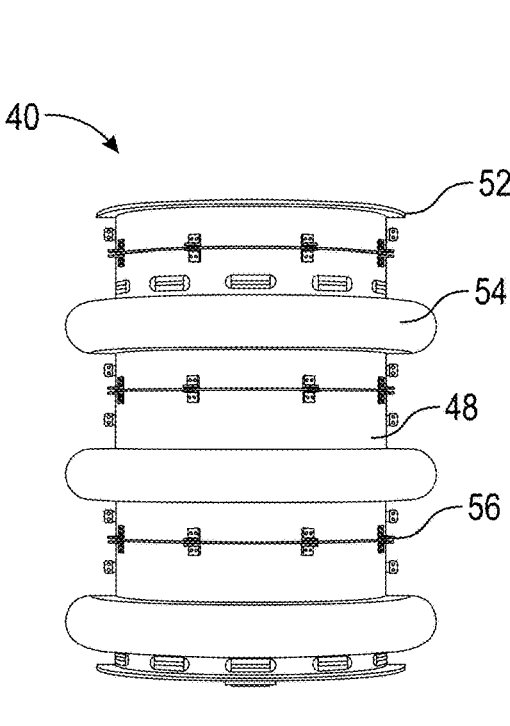
FIG. 8 illustrates a perspective view of flask barrel, in accordance with one embodiment of the present invention.
Figure 9:
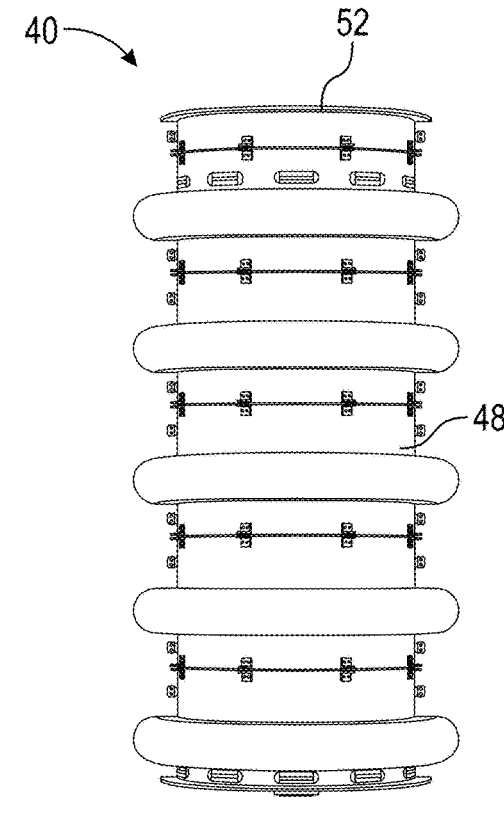
FIG. 9 illustrates a top perspective view and a cross-sectional view, respectively of the flask barrel, in accordance with one embodiment of the present invention.

FIG. 8 shows a front view of flask barrel 40, in accordance with one embodiment of the present invention. Flask barrel 40 includes a cylindrical member 48 having an opening 50 at the top. In one example, flask barrel 40 measures 594 mm in diameter and 900 mm in height. Flask barrel 40 measures 584 mm in diameter and 894 mm in height at its internal side. In one example, flask barrel 40 is constructed using three high-grade aluminum parts or other suitable materials depending on the need. The parts are joined together through Tungsten Inert Gas (TIG) welding. Once the welding process is complete, flask barrel 40 undergoes precision machining to achieve its desired geometrical dimensions and specified tolerances. In one example, flask barrel 40 includes a flask cap 52. FIG. 9 shows a front view of flask barrel 40 having flask cap 52 at the top. Flask cap 52 securely screws onto flask barrel 40 to ensure the integrity of the internal lubrication area encompassing two bearings. Further, flask barrel 40 includes a flask ring 54. Flask ring 54 mounts around cylindrical member 48, as can be seen from FIG. 8. In one example, flask ring 54 includes holes 56. Flask ring 54 provides a mounting surface for overall CMPES device 10 and offers additional support for ring gear 42.

Inside flask barrel 40, an additional welded ring 58 is positioned at the topmost point of flask barrel 40, as shown in FIG. 8. Welded ring 58 provides support for a second flask barrel (not shown) and acts as an assembly surface ensuring geometric concentricity, and offering suitable points for secure screwing and fastening of the second flask barrel.

Figure 10:
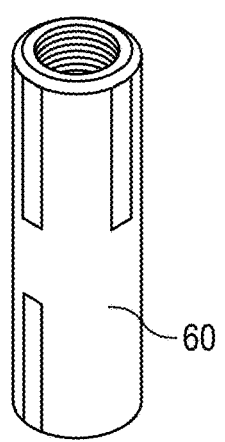
FIG. 10 illustrates a perspective view of a shaft, in accordance with one embodiment of the present invention.
Figure 11:
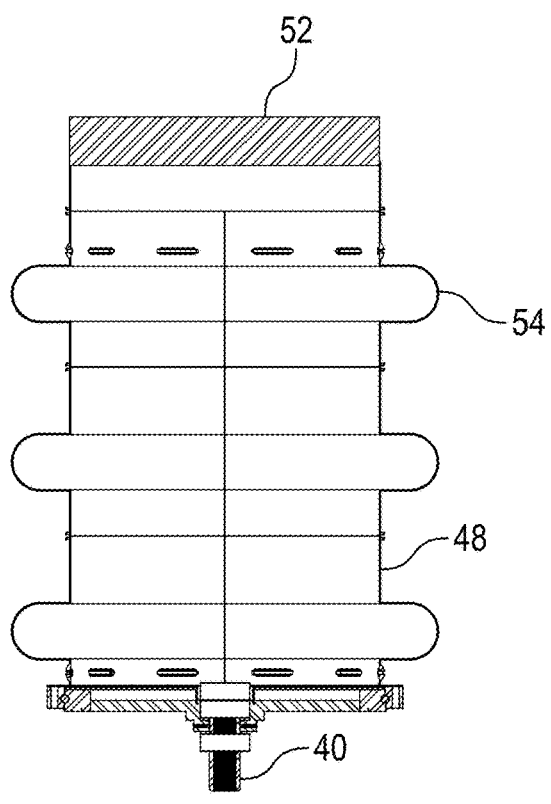
FIG. 11 illustrates a cross-sectional view of the flask barrel having the shaft, in accordance with one embodiment of the present invention.
Figure 12:
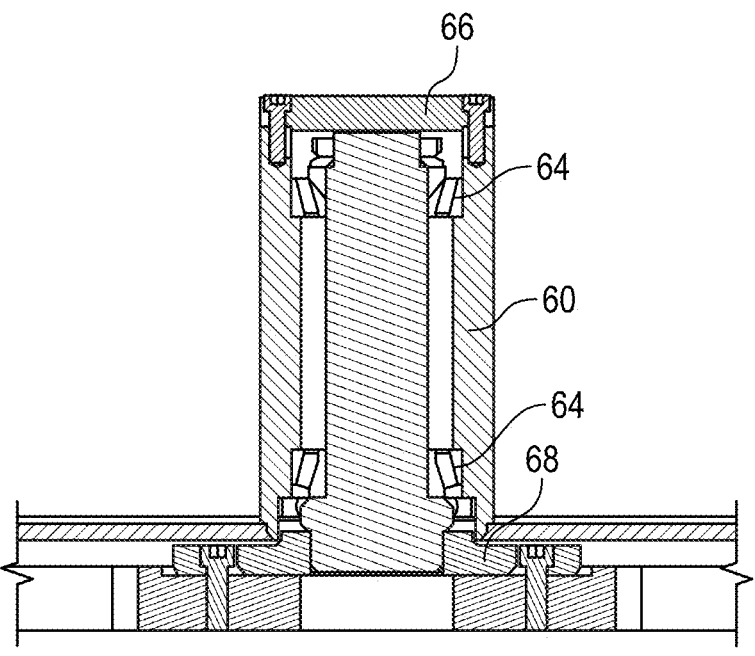
FIG. 12 illustrates the feature of roller bearings connected at the shaft, in accordance with one embodiment of the present invention.

Flask barrel 40 includes a shaft 60. FIG. 10 shows a perspective view of shaft 60, in accordance with one embodiment of the present invention. Shaft 60 undergoes precision machining processes to attain the desired geometry, tolerances, and concentricity. Shaft 60 securely attaches to the middle section of flask barrel 40 by screwing it into position. FIG. 11 shows a cross-sectional view of flask barrel 40 having shaft 60. Further, shaft 60 includes two tapered roller bearings 64, strategically positioned at a specific distance from each other. FIG. 12 shows the feature of roller bearings 64 connected at shaft 60. Roller bearings 64 play a crucial role in ensuring smooth rotational movement of shaft 60. To secure roller bearings 64 axially, a KM nut 66 is employed on the top side of shaft 60, effectively preventing any unintended displacement. To protect the interior of roller bearings 64 from external debris and contamination, a seal 68 is positioned at the bottom of shaft 60. Seal 68 acts as a barrier, safeguarding the bearing housing from potential contaminants that could adversely affect its service life. Additionally, seal 68 serves to prevent grease leakage from the internal side of the bearing housing, maintaining proper lubrication and operational efficiency. The inclusion of tapered roller bearings 64, along with the utilization of KM nut 66 and a reliable seal 68 enhances the overall performance and longevity of the shaft 60. The components work in harmony to ensure the smooth and efficient rotation of shaft 60 while effectively preventing the ingress of harmful contaminants.

Figure 13:
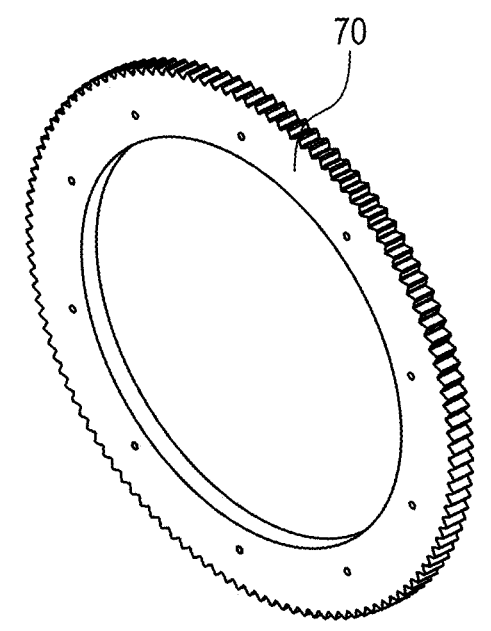
FIG. 13 illustrates a perspective view of ring gear, in accordance with one embodiment of the present invention.
Figure 14:
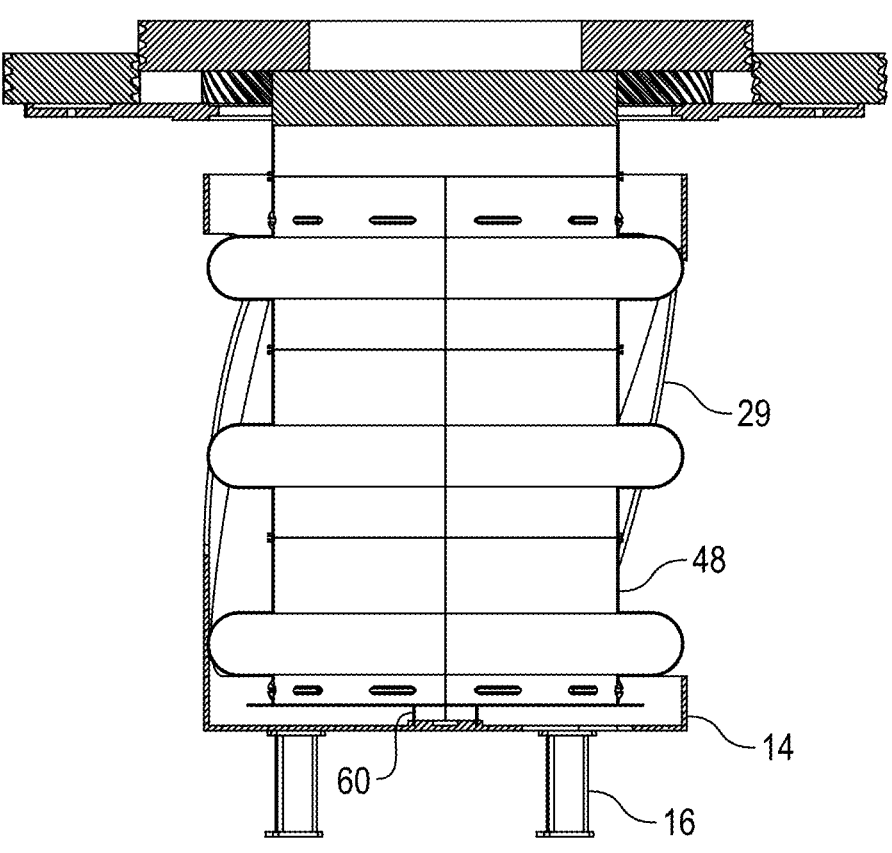
FIG. 14 illustrates a cross-sectional view of the flask barrel having the ring gear assembled to the shaft, in accordance with one embodiment of the present invention.

Further, flask barrel 40 includes a ring gear 70. FIG. 13 shows a perspective view of ring gear 70, in accordance with one embodiment of the present invention. Ring gear 70 attaches to flask barrel 40 at the top and to shaft 60 at its base. Further, ring gear 70 connects to a motor gear 80 of motor 44 and enables a reduction in rotational speed while simultaneously increasing torque output. In one example, ring gear 70 includes 150 helically shaped teeth, with an outer diameter of 803.2 mm and an inner diameter of 596 mm. Along its normal teeth surface, ring gear 70 includes ten (10) threaded holes with M10 specifications to facilitate the assembly of ring gear 70 to assembly of shaft 60. The threaded holes ensure a robust and reliable connection between ring gear 70 and the rest of the system. FIG. 14 shows a cross-sectional view of flask barrel 40 having ring gear 70 assembled to shaft 60.

Figure 15:
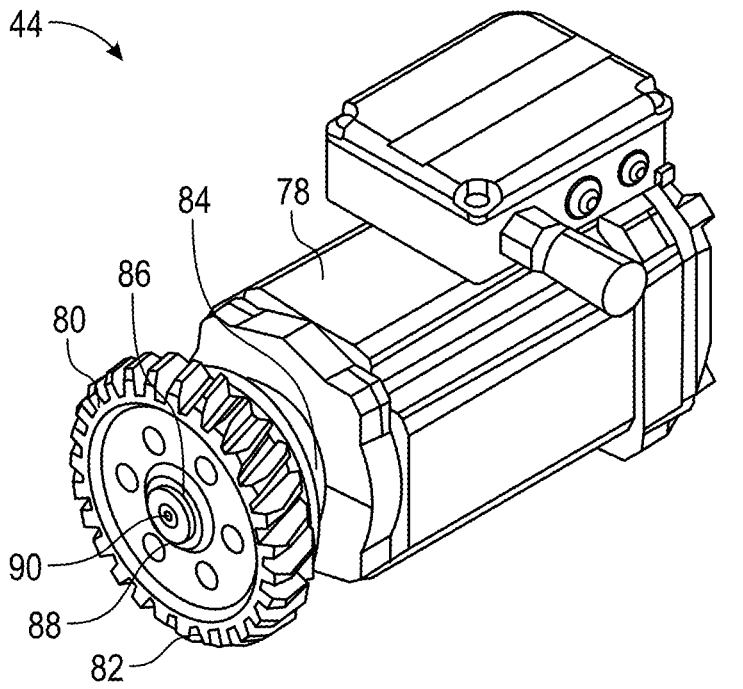

Further, CMPES device 10 includes motor 44. FIG. 15 and FIG. 16 show a perspective view and a cross-sectional view, respectively of motor 44, In accordance with one embodiment of the present invention. In accordance with the present invention, CMPES device 10 includes six (6) motors 44, each motor 44 designed to connect to top plate 30 at motor receiving section 34. Each motor 44 includes a motor housing 78 and is directly coupled to a helical gear (motor gear) 80 having 27 teeth. Motor gear 80 has 149.7 mm outer diameter. Each individual motor 44 is capable of delivering a power output of 0.75 kW, along with a nominal output torque of 4.95 Nm and a peak torque of 12.7 Nm. Motors 44 are meshed with the main barrel gear, which is directly connected to the central flask barrel 40. This configuration ensures effective power transmission throughout the system. When the total mass of the system/CMPES device 10 reaches its maximum of 720 kg, the maximum achievable rotational speed is approximately 250 rotations per minute (rpm), which is facilitated by three active motors. The usage of six motors 44 allows for a switching mechanism, where three motors are in use (active state) while the other three are in a resting state. This rotational power distribution ensures efficient operation and prevents excessive strain on any individual motor. To ensure a secure connection, motor gear 80 is equipped with helical teeth 82, enhancing efficiency and performance. Motor gear 80 is directly mounted on a main motor rotor shaft 84 and axially secured using a keyway 86, a steel cap 88, and a cone socket screw 90.

Further, CMPES device 10 includes five (5) disc flux generators (or disc generators) 92. FIG. 17 and FIG. 18 show perspective views of disc flux generator 92, in accordance with one embodiment of the present invention. Disc flux generators 92 position inside flask barrel 40 whereby each disc flux generator 92 is designed to produce the desired kilowatt output. Disc flux generators 92 are constructed using three high-quality aluminum parts that are TIG welded together. Flask barrel 40 serves as one of the components, along with a smaller support inside the cylinder and a ring equipped with screwing threads and through holes. Disc flux generators 92 are mounted directly inside flask barrel 40, ensuring they are centered at the top of main motor rotor shaft 84 within flask barrel 40. This configuration allows for efficient power generation and facilitates the proper alignment and functioning of the disc generators. By placing disc flux generators 92 inside flask barrel 40, the overall structural integrity and stability of CMPES device 10 is maintained, ensuring reliable and consistent electricity production.

In one implementation, the design of disc flux generators 92 incorporates a larger-sized disc flux generator 92 at the bottom of flask barrel 40 in order to deliver higher kilowatt output. In other words, disc flux generators 92 are optimized for increased power generation. The construction of these larger-sized disc flux generators 92 involves utilizing high-quality materials and advanced manufacturing techniques. By strategically placing the larger disc flux generators 92 at the bottom of flask barrel 40, the design ensures efficient utilization of available space and maximizes power output.

The configuration allows for enhanced energy conversion and improved overall performance of the machine. Here, the larger-sized disc flux generators 92 contribute to a significant increase in kilowatt output, making CMPES device 10 capable of generating higher levels of electricity. Larger-sized disc flux generators 92 enhances CMPES device 10 potential for meeting the energy demands of various applications, including those requiring a substantial power supply. The construction of CMPES device 10 incorporates these larger-sized disc flux generators 92 to provide a reliable and efficient solution for generating higher kilowatt output, addressing the needs of a wide range of power requirements.

Figures 19, 20:
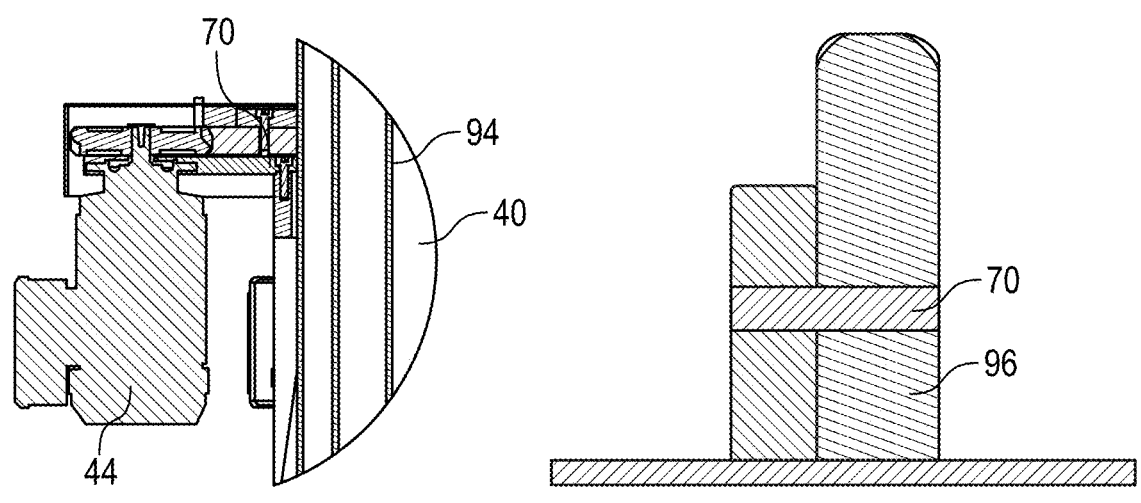
FIG. 19 illustrates a cross-sectional view of the CMPES device, in accordance with one embodiment of the present invention.
FIG. 20 illustrates dowel pins secured to the ring gear, in accordance with one embodiment of the present invention.

FIG. 19 shows a cross-section of CMPES device 10, specifically the area motor 44 and its gear mesh with ring gear 70 connected. Ring gear 70 along with a protective sheet 94 on the outside are securely screwed to flask barrel 40. Additionally, the partial section view showcases three assembled flask barrels on the interior (located on the right side of the section view). In order to mount motor 44, at first, motor 44 is positioned from the bottom side of top plate 30 and secured in place using four bolts. A distance ring is then placed on top of main motor rotor shaft 84, followed by the pinion gear. To prevent torsion, a keyway with dimensions of 6×30 mm is added to the main motor rotor shaft 84. Axially, the gear is secured using a cap and a cone socket bolt. Next, ring gear 70 is assembled onto flask barrel 40. In one example, ten M10 screws are used to firmly bolt it in place. To ensure stability and prevent twisting of the screws, five DIN 8732 10×50 dowel pins 96 are added to secure ring gear 70, as shown in FIG. 20. This construction design guarantees a secure and reliable connection between motor 44, gear, and ring gear 70, maintaining the integrity and functionality of CMPES device 10.

Figure 21:
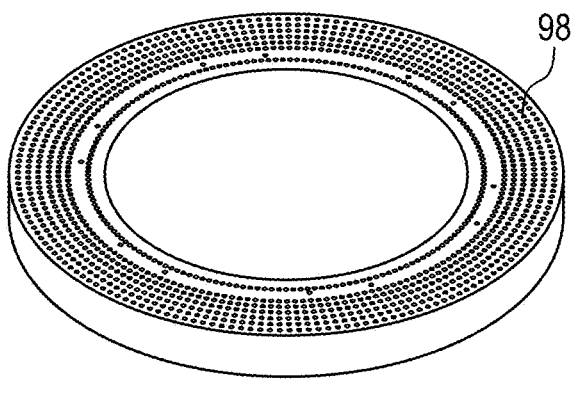
FIG. 21 illustrates a protective fence, in accordance with one embodiment of the present invention.

Further, CMPES device 10 includes a protective fence 98, as shown in FIG. 21. In one embodiment, protective fence 98 is installed over the top of the assembly of CMPES device 10, encompassing a pinion gear and ring gear. Protective fence 98 is constructed from perforated sheet metal steel, which is precisely laser-cut to create the mesh pattern. On the bottom side of the sheet, a vertical ring is point welded, adding further reinforcement. Protective fence 98 features multiple holes that facilitate its assembly to the main top plate 30 of the main structure. These holes serve as attachment points for securing the protective mesh in place. To guard against corrosion, protective fence 98 is treated with a corrosion-resistant paint coating. Protective fence 98 effectively safeguards the assembly, ensuring the longevity and durability of the machine by preventing unwanted contact or interference with the pinion gear and ring gear.

Figure 22:
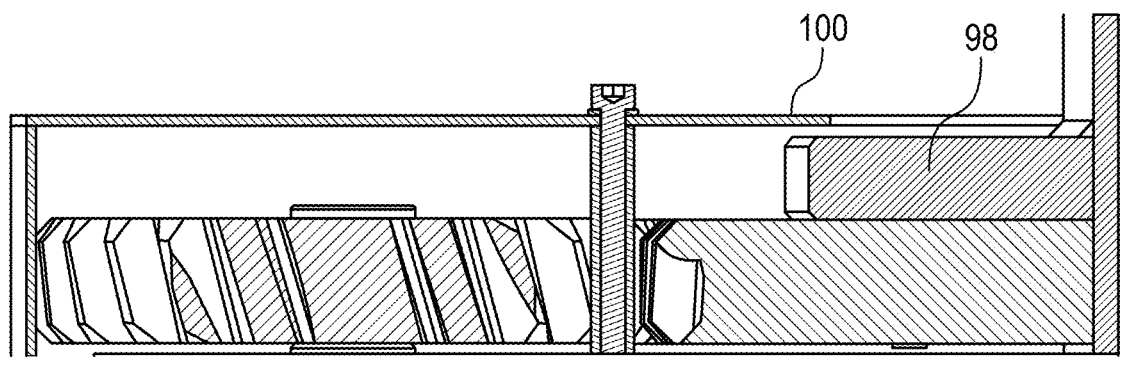
FIG. 22 illustrates the protective fence strategically positioned using twelve distance rings, in accordance with one embodiment of the present invention.

FIG. 22 shows protective fence 98 strategically positioned using twelve distance rings 100 that are situated in close proximity to the electrical motors 44. Rings 100 ensure that protective fence 98 is set at a safe distance from both the motor drive gear and the machine ring gear. The arrangement guarantees that there is ample space, preventing any possibility of tools or hands coming into contact with the rotating gears while CMPES device 10 is in operation. The inclusion of distance rings 100 prioritizes safety and mitigates the risk of accidents or unwanted interactions with the moving parts of CMPES device 10.

Figure 23:
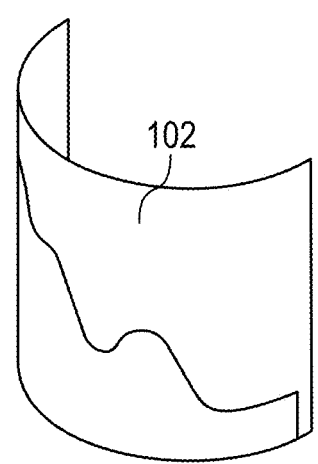
FIG. 23 illustrates a perspective view of decorative panel, in accordance with one embodiment of the present invention.

Further, CMPES device 10 includes decorative panels 102. FIG. 23 shows a perspective view of decorative panel 102, in accordance with one embodiment of the present invention. Decorative panels 102 are used to conceal and protect the bottom side of CMPES device 10. In one example, two half-circle sheet metal decorative panels 102 are used to cover the bottom side of CMPES device 10. Decorative panels 102 are precisely bent to match the diameter of the main body machine structure. To ensure a secure fit, these two decorative panels 102 are directly fastened to the main steel frame using several screwing points with DIN 7991 M4 screws. The construction method ensures a neat and seamless appearance while providing structural integrity and stability to the machine.

Figure 24:
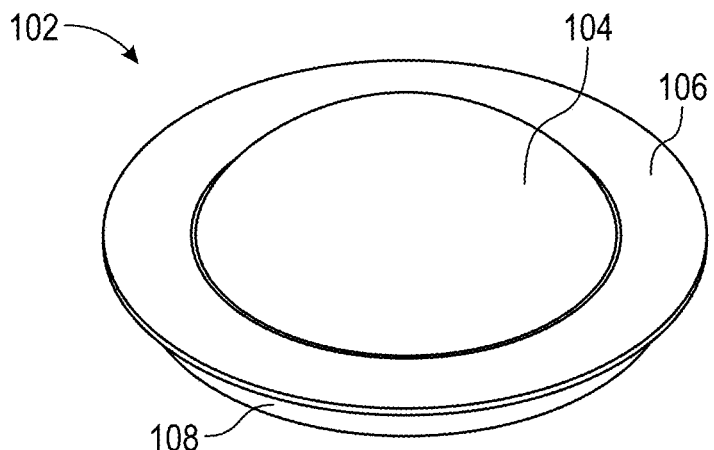
FIG. 24 and FIG. 25 illustrate a perspective view and a cross-sectional view, respectively of a cover cap, in accordance with one embodiment of the present invention.
Figure 25:
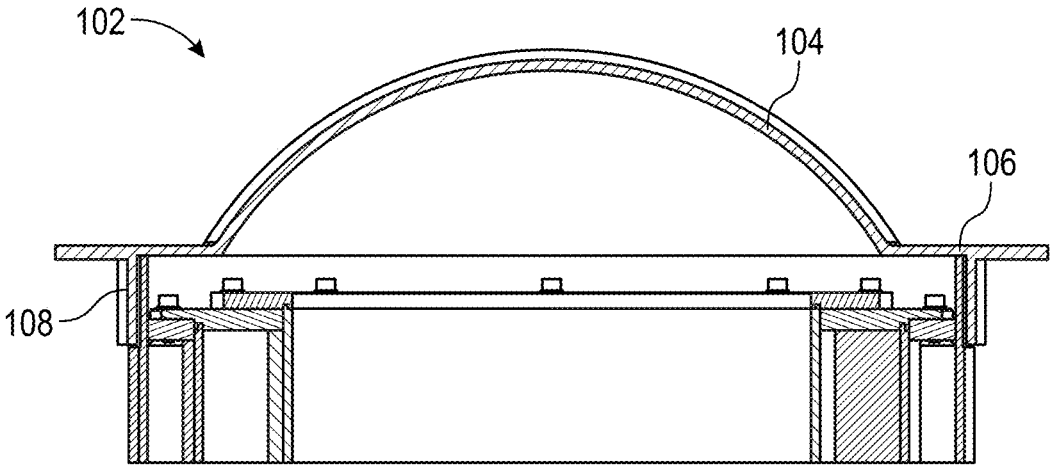

Furthermore, CMPES device 10 includes a cover cap 104. FIG. 24 and FIG. 25 show a perspective view and a cross-sectional view, respectively of cover cap 104, in accordance with one embodiment of the present invention. Cover cap 104 is constructed using PA6 plastic material and has a dome shape 106. Dome shape 106 can be replaced with alternative shapes as needed. Cover cap 104 is designed to be manually inserted into flask barrel 40 by applying pressure from the top until it is securely positioned to flask barrel 40. To facilitate ease of use, cover cap 106 features a small flange-like geometry 108 on its side, providing ample grip for opening or closing the upper section of CMPES device 10. The design ensures convenient access to the internal components while maintaining a secure and enclosed environment.

Now referring to FIG. 26 to FIG. 52, operation of CMPES device 10 is explained, in accordance with one exemplary embodiment of the present invention. As specified above, CMPES device 10 includes five (5) disc flux generators 92 positioned inside flask barrel 40. In order to achieve constant rotation, reaching full rotation of 250 rpm or necessary rotating rpm to generate desired kilowatt in 60 seconds or more achieving constant rotation, results in continuous power output. In the present embodiment, three out of six motors 44, each capable of delivering at least 0.75 kW power and a combined power output of 2.25 kW power to rotate flask barrel 40 constantly are considered. Three motors 44 get the power from disc flux generators 92 and give the power output to electrical panel systems connected to CMPES device 10.

Figure 26:
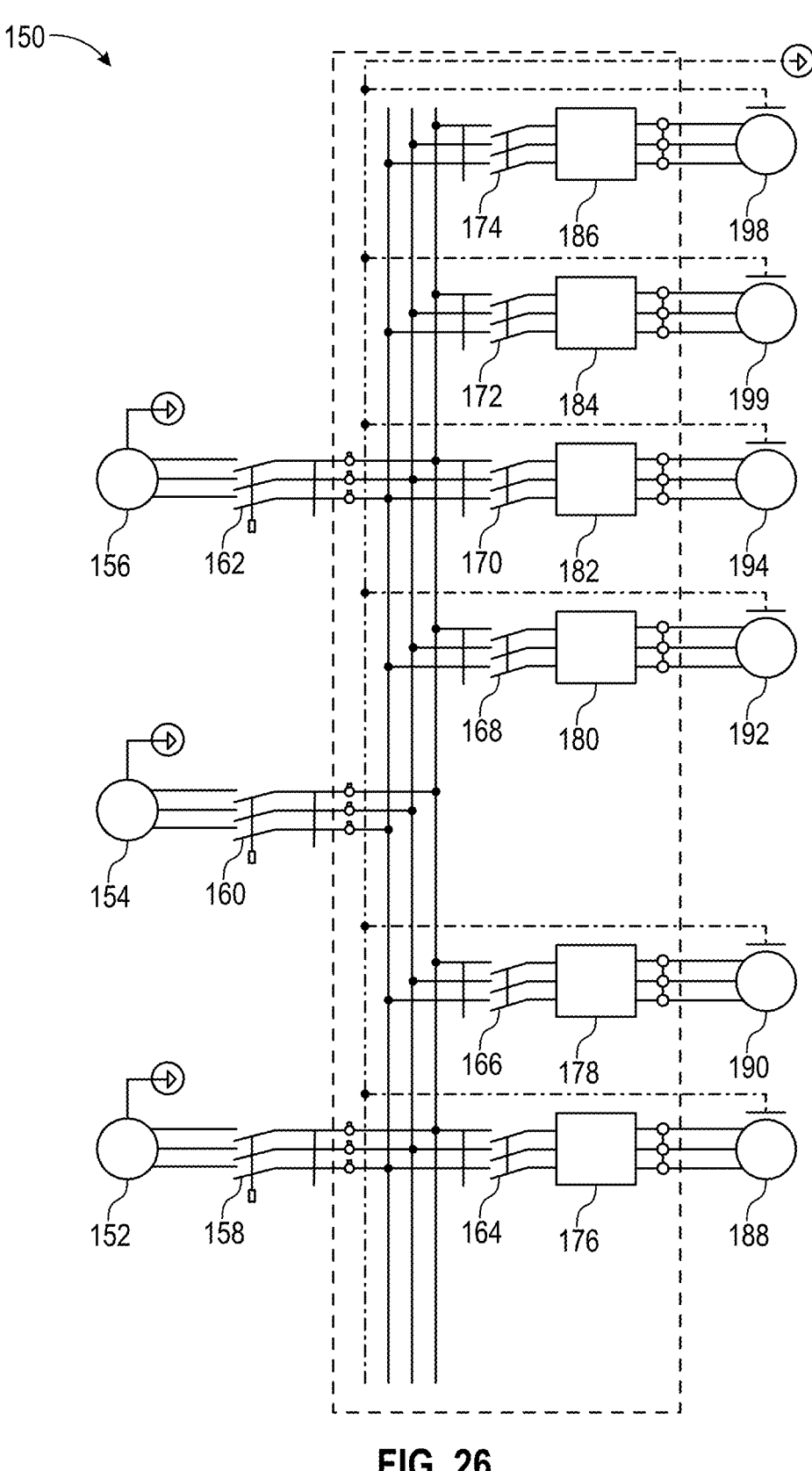
FIG. 26 illustrates a circuit diagram, in accordance with one embodiment of the present invention.

FIG. 26 shows a circuit diagram 150 of 3-phase electric supply originating from disc flux generators 92 to electrical panel systems. Circuit diagram 150 includes three power sources (three phase power sources of 15 kW) 152, 154, 156 connected to Variable Frequency Drives (VFD) 176, 178, 180, 182, 184, 186 via circuit breakers 158, 160, 162, 164, 166, 168, 170, 172, 174. Further, VFDs 176, 178, 180, 182, 184, 186 connect to motors 188, 190, 192, 194, 196 and 198. Here, each motor 188, 190, 192, 194, 196 and 198 delivers a power output of 0.075 kW. As specified above, cylinder flask barrel 40 full rotation rpm produces enough rpm speed for disc flux generators 92 to give the desired, setting output power up to hundreds of kilowatts. Here, disc flux generators 92 are arranged in combination of 5 kW-100 kW. Disc flux generators 92 are arranged to provide a total of output kilowatts at about 85% efficiency in total sum of disc flux generators which flask barrel 40 holds and rotates constantly with rotation of 250 rpm or desired rpm. The power output from disc flux generators 92 and flask barrel 40 give continuous power to motors 44 which run its own motors for constant rotation and speed rpm as needed.

Figure 28:

FIG. 27 and FIG. 28 show tables 200, 210 presenting initiation calculation and selection of motors. The motor selection process begins with the initial requirements provided. The key criteria include an approximated load mass of 600 kg from disc flux generators 92, a maximum rotation speed of flask barrel 40 at 250 rpm, and a preference for low motor power output, ideally around 0.5 kW per motor. The initial flask barrel 40 geometry is approximately 750 mm.

Another requirement is to have at least three motors on CMPES device 10, although more than two motors are desired. In order to analyze CMPES device's 10 kinematics and dynamics, a preliminary calculation is performed, incorporating a 20% safety margin and an acceleration time of approximately 60 seconds with an added mass of 720 kg. In order to reduce the motor size and meet the desired requirements, the possibility of incorporating a gearbox is considered. A gear module of 5 is used to check whether the gears can handle the driving forces applied to the ring gear. Pinion gear having 27 teeth is considered. Considering the use of rolling bearings, a friction coefficient of 0.01 is assumed. The system's preload is accounted for and set at 30% of the total. The calculations were conducted considering the use of three motors.

From the initiation calculation and selection, it is observed that a motor with a power output of 1.1 kW provides a most suitable solution, even for a load of 720 kg with the disc flux generators 92 and flask barrel 40. However, due to the requirement of having a motor with less than 1 kW power output, the second solution is chosen as the first-best candidate. Although the motor with 1.1 kW is slightly over-dimensioned for the 720 kg load, it has shown to operate at 83% capacity during the initial acceleration stage and 32% during nominal operation time. The initial pinion drive gear with a module of 5, 27 teeth, and a diameter of 143.239 mm resulted in a transmission ratio of i=5.5556 indicating that from the motor's initial speed of 1465 rpm, the rotational speed is reduced to 263 rpm.

Subsequently, a second calculation is conducted for a required mass of 600 kg at 250 rpm, using the same drive pinion gear and a transmission ratio of 5.5556. The results obtained are presented in tables 220, 230 shown in FIG. 29 and FIG. 30.

Figure 31:
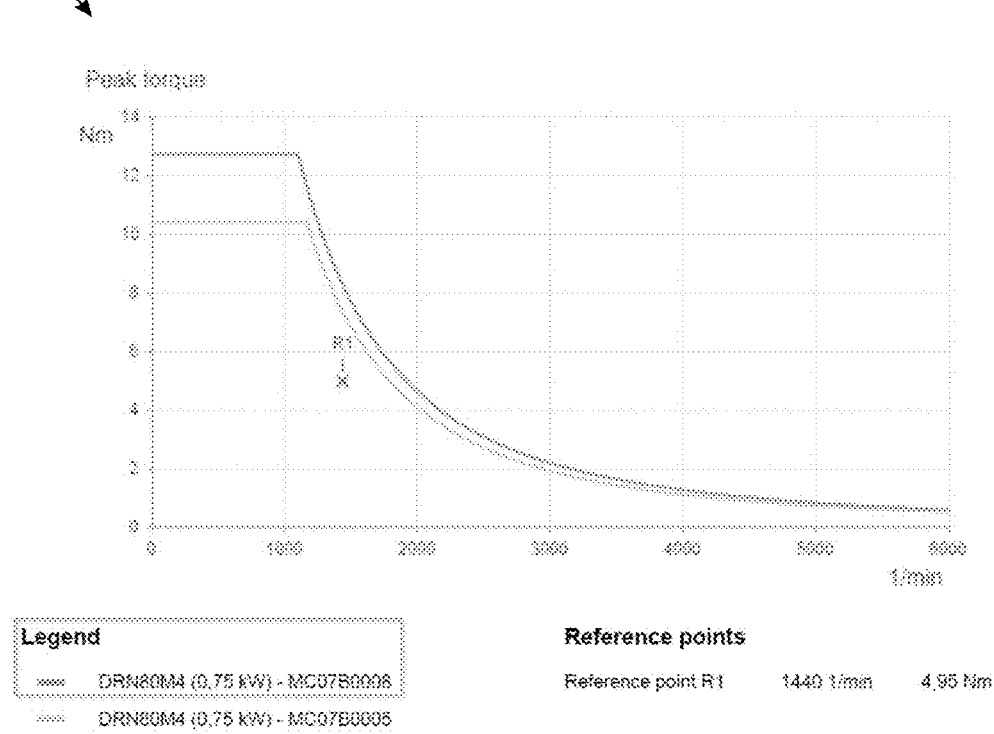
Figure 34:
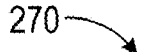
FIG. 34 illustrates output calculation and design of the gears, in accordance with one embodiment of the present invention.

After conducting the second preliminary calculation, the resulting data indicated that the SEW Eurodrive motor with a power output of 0.75 kW, a speed of 1440 rpm, and a torque of 4.95 Nm is the most suitable and balanced candidate for selection. This motor demonstrated optimal utilization, with almost 102% of its acceleration torque being utilized during the initial starting acceleration phase. To further validate this selection, a third calculation was performed. The results from this calculation confirmed the suitability of the SEW Eurodrive SEW IE3 DRN80M4 motor for the present application. The motor characteristics i.e., torque speed graph 240 and peak torque 250 are shown in FIG. 31 and FIG. 32, respectively.

Figure 35:
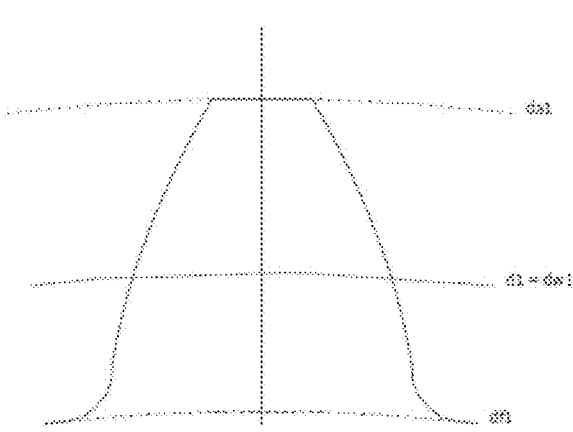
Figure 36:
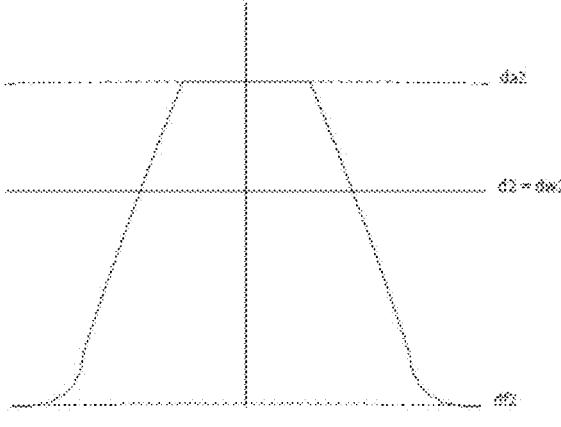
Figure 37:
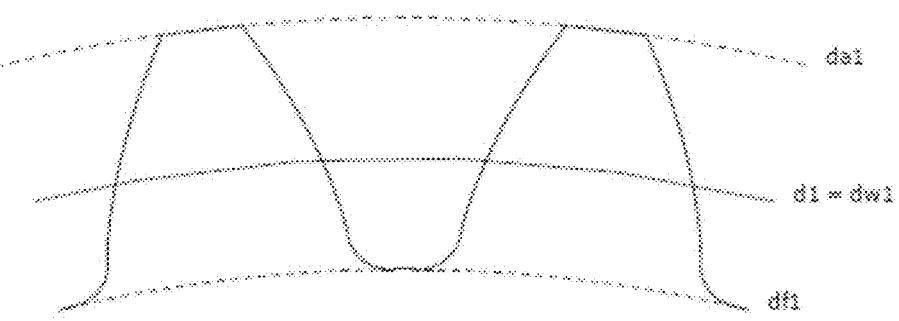
Figure 38:
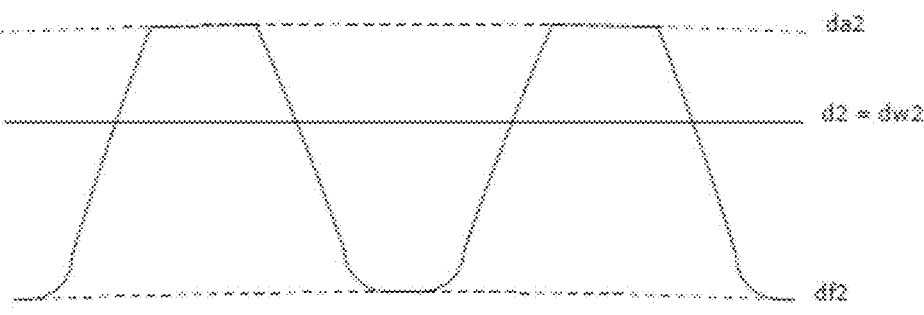

Referring to FIG. 33, a table 260 showing input data for gear (ring gear and drive gear) profile design is shown. Based on the initial preliminary kinematic and dynamic calculation of the motor, the basic sizes for the pinion and ring gear are determined. To further refine the design of these gears, a precise calculation is performed using the MDESIGN™ software, which is specifically used for dimensioning mechanical components and elements. The calculation is performed based on the guidelines provided by the DIN 3990 standard. The input data required for creating the gear teeth calculation, including the profile, tip root diameter, and reference diameter, are illustrated in FIG. 33. The parameters are considered to ensure the accurate sizing and performance of both the pinion driver gear and the driven ring gear. Based on the initial input data, output calculation and design of the gears received is presented in a table 270 shown in FIG. 34. Further, tooth profile (evolvent) pinion 280 is shown in FIG. 35 and tooth profile (evolvent) gear 290 is shown in FIG. 36. In addition, gap of tooth (envelope curve, evolvent) pinion 300 is shown in FIG. 37 and gap of tooth (envelope curve, evolvent) gear 310 is shown in FIG. 38. FIG. 39 shows a side view of pinion 320 and FIG. 40 shows a side view of gear 330. FIG. 41 shows a front view of pinion 340 and FIG. 42 shows a front view of gear 350.

Figure 43:
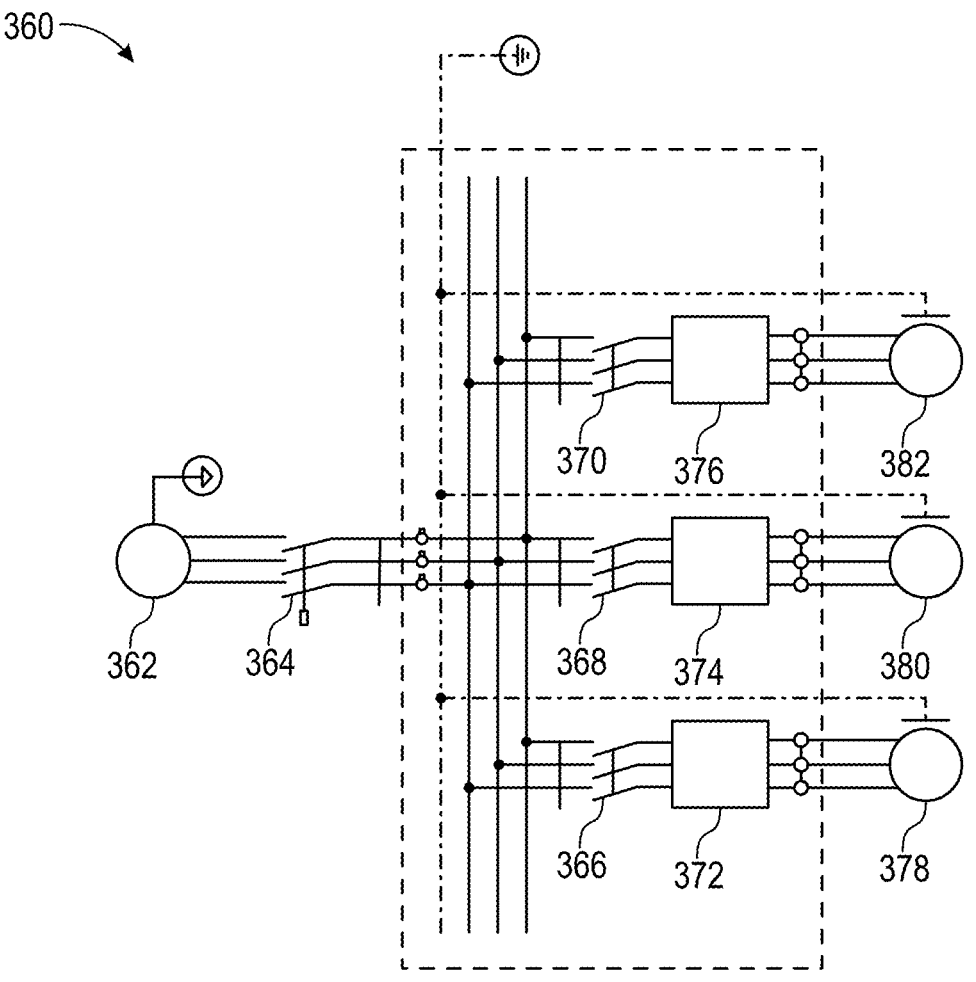
FIG. 43 illustrates circuit diagram, in accordance with another embodiment of the present invention.

FIG. 43 shows a circuit diagram 360 of 3-phase electric supply originating from disc flux generators to electrical panel systems. Circuit diagram 360 includes a single power source (three phase power source of 5 kW) 362 connected to Variable Frequency Drives (VFD) 372, 374, 376 via circuit breakers 364, 366, 368, 370. Further, VFDs 372, 374, 376 connect to motors 378, 380, 382. Here, each motor 378, 380, 382 delivers a power output of 0.075 kW. As specified above, cylinder flask barrel 40 full rotation rpm produces enough rpm speed for disc flux generators 92 to give the desired, setting output power up to hundreds of kilowatts. Here, disc flux generators are arranged in combination of 5 kW-100 kW. Disc flux generators are arranged to provide a total of output kilowatts at about 85% efficiency in total sum of disc flux generators which flask barrel 40 holds and rotates constantly with rotation of 250 rpm or desired rpm. The power output from disc flux generators and flask barrel 40 give continuous power to motors which run their own motors for constant rotation and speed rpm as needed.

Figure 44:
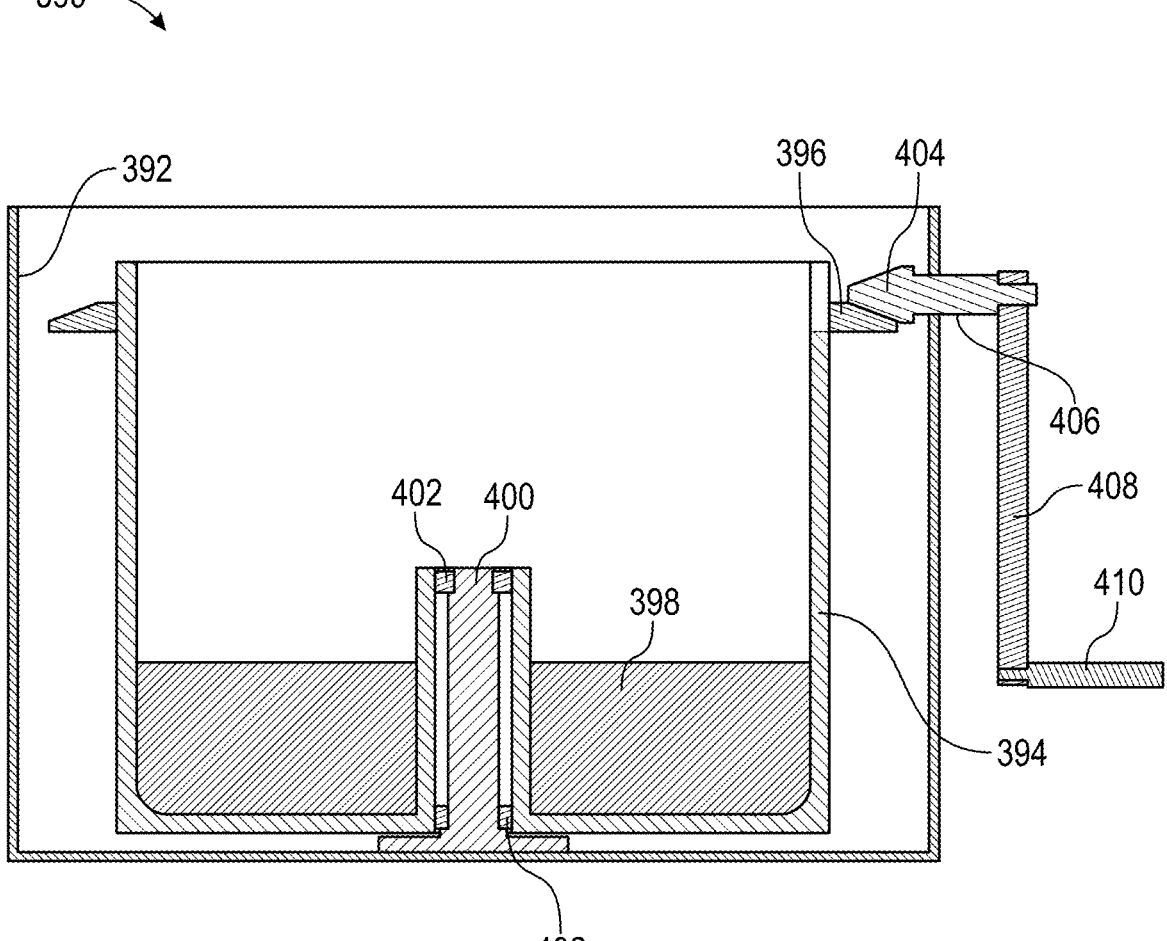
FIG. 44 illustrates a cross-sectional view of a CMPES device utilizing a hand crank handle system, in accordance with one embodiment of the present invention.

In one implementation, CMPES device utilizes a hand crank handle system for initiating a motor. FIG. 44 shows a cross-sectional view of a CMPES device 390 utilizing a hand crank handle system, in accordance with one exemplary embodiment of the present invention. CMPES device 390 includes an outer shell 392 encompassing a cylindrical barrel 394. Barrel 394 includes a bevel gear wheel 396. Bottom 398 of barrel 394 presents a mixing material. Further, barrel 394 includes a shaft 400 having bearings 402 at the top and bottom. CMPES device 390 presents a bevel gear pinion 404 connecting bevel gear wheel 396. Further, bevel gear pinion 404 connects to a bearing sleeve 406, which in turn connects to a handle 408. Handle 408 includes a lever 410.

Here, hand crank system having handle 408 is used to produce initiation, power, and output for three motors 378, 380, 382 when CMPES device 390 needs to start working in very remote areas. The hand crank system helps to take away battery storage or grid power to use. The hand crank device system includes gears and a small size cylinder of 375 mm diameter as presented in FIG. 45 using table 420. Hand crank device system helps to reach 150 rpm for a mass of 150 kg cylinder containing one 5 kW disc flux generator. This results in full rotation by hand in a very short time by a normal person. Starting from 1 to 5 minutes will produce a 150-rpm speed rotation for a 5 kW disc flux generator in the small cylinder to have enough power of output of 2.25 kW for 3 motors of 0.785 kW each to establish a full rotation for the CMPES cylinder barrel system. Pinion and wheel bevel gear (bevel and hypoid gear for 5 kW cylinder barrel) calculations are shown in Tables 430, 430, 440, 450, 460, 470, 480 and 490 presented in FIG. 46, FIG. 47, FIG. 48, FIG. 49, FIG. 50, FIG. 51 and FIG. 52 respectively.

The presently disclosed CMPES device provides several advantages over the prior art. The CMPES device utilizes multiple disc flux generators arranged in a cylindrical shape and constantly powered for rotation using low-wattage motors. The inclusion of disc flux generators is particularly advantageous due to their proven high efficiency and minimal maintenance requirements. The overall system design has been optimized to be cost-effective in terms of manufacturing, installation, and maintenance, ensuring accessibility to a wide range of applications and users. By addressing the shortcomings of traditional renewable energy technologies, the CMPES device generates a consistent power supply that is not dependent on weather conditions. The CMPES device eliminates the need for a separate storage system, streamlining the overall energy generation process. By circumventing the existing obstacles associated with renewable energy devices, this invention presents a distinctive and invaluable contribution to the ongoing transition toward sustainable energy generation. The CMPES device potential lies in its ability to establish a more efficient and reliable renewable energy system, ushering in a new era of sustainable power generation.

A person skilled in the art appreciates that the CMPES device can come in a variety of shapes and sizes depending on the need. Further, many changes in the design and placement of components may take place without deviating from the scope of the presently disclosed CMPES device.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

What is claimed is:

1. A constant micro power energy system (CMPES) device, comprising:
   a main body structure comprising a base plate, a frame extending from said base plate, and a top plate positioned at the top of said frame;
   a flask barrel positioned in said frame;
   motors positioned on said top plate, wherein each motor is splined to a helical gear, and wherein each of said motor comprises a motor shaft;
   a ring gear connecting said flask barrel and said motor shaft; and
   disc generators positioned inside said flask barrel,
   wherein said motors supply power to drive said flask barrel to rotate constantly at a predetermined speed in order to generate continuous and simultaneous Alternating Current (AC) and Direct Current (DC) electrical power output, and wherein said motors facilitate direct transmission to said disc generators in order to provide the electrical power output to panel systems connected to said CMPES device.

2. The CMPES device of claim 1, wherein said motors generate the electrical power output of 2.25 kilowatt (kW).

3. The CMPES device of claim 1, wherein each of said motors are configured to deliver a power output of 0.075 kW to 1.1 kW.

4. The CMPES device of claim 3, wherein two or more motors of said motors are configured to be in an active state and remaining motors of said motors are configured to be in a resting state, and wherein said two or more motors in the active state deliver a combined power output of 2.25 kW to rotate said flask barrel constantly.

5. The CMPES device of claim 2, wherein said flask barrel rotates at the predetermined speed of 250 rotations per minute (rpm).

6. The CMPES device of claim 1, wherein said disc generators are positioned inside said flask barrel such that a larger-sized disc generator of said disc generators positions at the bottom to deliver a higher kilowatt output, and wherein said disc generators are adjustable without changing the functionality of rotating of a cylinder in the disc generators.

7. The CMPES device of claim 1, further comprises decorative panels, wherein said decorative panels encapsulate the bottom side of said main body structure.

8. The CMPES device of claim 1, further comprises a cover cap, wherein said cover cap inserts onto said flask barrel and facilitates convenient opening and closing.

9. The CMPES device of claim 1, wherein said disc generators are arranged in combination of 5 kW-100 kW disc generators.

10. The CMPES device of claim 1, further comprises a protective fence and distance rings, wherein said protective fence positions on said distance rings to provide a safe distance between a motor drive gear of each of said motor and said ring gear in order to prevent accidental contact during operation.

11. The CMPES device of claim 1, wherein said flask barrel and said disc generators are configured to efficiently extract and generate micro power from continuous motion to provide the electrical power output.

12. The CMPES device of claim 1, wherein said flask barrel and said top plate are assembled to form a rigid and precise structure in order to ensure optimal alignment and stability during operation.

13. The CMPES device of claim 1, further comprises a control system to monitor and regulate the power output of said disc generators in order to ensure optimal energy conversion and utilization.

14. The CMPES device of claim 1, further comprises a hand crank handle system, wherein said hand crank handle system facilitates in manual initiation of power to operate said motors.

15. A method of providing a constant micro power energy system (CMPES) device for generating power, said method comprising the steps of:

providing a main body structure having a base plate, a frame extending from said base plate, and a top plate positioning at the top of said frame;

providing a flask barrel positioned in said frame;

providing motors positioned on said top plate, each motor splined to a helical gear, each of said motor comprising a motor shaft;

providing a ring gear connecting said flask barrel and said motor shaft;

providing disc generators positioned inside said flask barrel;

operating said motors for suppling power to drive said flask barrel to rotate constantly at a predetermined speed in order to generate continuous and simultaneous Alternating Current (AC) and Direct Current (DC) electrical power output; and facilitating direct transmission from said motors to said disc generators in order to provide the electrical power output to panel systems connected to said CMPES device.

16. The method of claim 15, further comprising selectively operating two or more motors of said motors for delivering a combined power output of 2.25 kW to rotate said flask barrel constantly.

17. The method of claim 15, further comprising operating said flask barrel to rotate at the predetermined speed of 50-1500 rotations per minute (rpm).

18. The method of claim 15, further comprising:

positioning a larger-sized disc generator of said disc generators at the bottom to deliver a higher kilowatt output; and adjusting said disc generators without changing the functionality of rotating of a cylinder in the disc generators.

19. The method of claim 15, further comprising providing a control system for monitoring and regulating the power output of said disc generators in order to ensure optimal energy conversion and utilization.

20. The method of claim 15, further comprising providing a hand crank handle system for manually initiating power to operate said motors.

* * * * *